United States Patent
Al Hamouz et al.

(10) Patent No.: US 8,895,633 B2
(45) Date of Patent: Nov. 25, 2014

(54) CROSS-LINKED POLYAMINOCARBOXYLATES FOR THE REMOVAL OF METAL IONS FROM AQUEOUS SOLUTIONS

(71) Applicant: King Fahd University of Petroleum and Minerals, Dhahran (SA)

(72) Inventors: Othman Charles Sadeq Othman Al Hamouz, Dhahran (SA); Shaikh Asrof Ali, Dhahran (SA); Nouri Mohammed Hassan, Riyadh (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 152 days.

(21) Appl. No.: 13/784,750

(22) Filed: Mar. 4, 2013

(65) Prior Publication Data

US 2014/0249284 A1    Sep. 4, 2014

(51) Int. Cl.
C08F 226/04 (2006.01)
C08F 226/06 (2006.01)
C08F 26/06 (2006.01)

(52) U.S. Cl.
CPC ................................ *C08F 26/06* (2013.01)
USPC ............... 521/31; 521/38; 521/40; 526/263; 210/681; 210/688

(58) Field of Classification Search
USPC ................... 521/31, 38, 40; 526/263
See application file for complete search history.

(56) References Cited

U.S. PATENT DOCUMENTS

| 2,611,768 | A | 9/1952 | Butler et al. |
|---|---|---|---|
| 2,687,382 | A | 8/1954 | Butler et al. |
| 3,862,059 | A | 1/1975 | Greco et al. |
| 4,715,962 | A | 12/1987 | Bhattacharyya et al. |
| 6,646,083 | B2 | 11/2003 | Hirano et al. |
| 2002/0028887 | A1* | 3/2002 | Hirano et al. ............... 525/327.1 |
| 2011/0281197 | A1 | 11/2011 | Daikoku et al. |

OTHER PUBLICATIONS

Al Hamouz, Othman Charles S. et al., "Removal of Heavy Metal Ions Using a Novel Cross-linked Polyzwitterionic Phosphonate", Separation and Purification Technology, 98, 94-101, Sep. 19, 2012.
Bicak, Niyazi et al., "New Strong Cationic Hydrogels: Preparation of N,N,N'N'-Tetraallyl Piperazinium Dibromide and Its Copolymers with N,N-Diallyl Morpholinium Bromide", Journal of Polymer Science: Part A: Polymer Chemistry, 38, 1006-1013, 2000.
Korpe, Sinan et al., "Crosslinked DADMAC Polymers as Cationic Super Absorbents", Reactive and Functional Polymers, 69, 660-665, 2009.

* cited by examiner

*Primary Examiner* — Roberto Rabago
(74) *Attorney, Agent, or Firm* — Richard C. Litman

(57) ABSTRACT

The cross-linked polyaminocarboxylates for the removal of metal ions from aqueous solutions of the present invention are cross-linked anionic polyelectrolytes CAPE 6 and CAPE 9, containing pH-responsive amino acid residues. The cross-linked anionic polyelectrolytes have been synthesized via cycloco-polymerization and ter-polymerization of a diallylammonioethanoate monomer (90 mol %) and a cross-linker, 1,1,4,4-tetraallylpiperazinium dichloride (10 mol %) in the absence of SO2 (CAPE 6) and in the presence of $SO_2$ (CAPE 9), respectively. For the sorbents CAPE 6 and CAPE 9, the efficiency of $Cu^{2+}$ removal at an initial metal concentration of 200 ppb was found to be 77.5% and 99.4%, respectively. Treatment of real wastewater samples spiked with $Cu^{2+}$ ions showed the excellent ability of the cross-linked anionic polyelectrolytes to adsorb metal ions.

4 Claims, 26 Drawing Sheets

| ICP-MS instrumental operating parameters ICP-MS XSERIES-II Thermo Scientific | |
|---|---:|
| RF power (W) | 1403.92 |
| Plasma gas flow (L/min) | 13.02 |
| Nebulizer gas flow (L/min) | 0.95 |
| Auxiliary gas flow (L/min) | 0.7 |
| Nebulizer | Quartz pneumatic nebulizer |
| Spray chamber | Glass with peltier cooling |
| Number of replicates | 3 |
| Acquisition mode | Pulse counting |
| Dwell time (ms) | 10 |
| Sweeps/Reading | 100 |

*Fig. 11*

Lagergren second-order kinetic model parameters for CAPE 6 and CAPE 9 adsorption.

| CAPE | Temp (K) | $q_{e,exp}$ (mg g$^{-1}$) | $k_2$ (h$^{-1}$ g mg$^{-1}$) | $h^a$ (h$^{-1}$ g$^{-1}$ mg) | $q_{e,cal}$ (mg g$^{-1}$) | $R^2$ | $E_a$ (kJ mol$^{-1}$) |
|---|---|---|---|---|---|---|---|
| CAPE 6 | 298 | 0.234 | 57.9 | 3.26 | 0.237 | 0.9995 | |
| | 306 | 0.239 | 64.2 | 3.78 | 0.243 | 0.9995 | 11.8 |
| | 324 | 0.255 | 84.6 | 5.60 | 0.257 | 0.9996 | |
| CAPE 9 | 298 | 0.364 | 24.8 | 2.94 | 0.344 | 0.9994 | |
| | 306 | 0.365 | 27.3 | 3.25 | 0.345 | 0.9993 | 10.6 |
| | 324 | 0.373 | 34.9 | 4.31 | 0.352 | 0.9997 | |

$^a$Initial adsorption rate $h = k_2 q_e^2$

*Fig. 12*

Langmuir, Freundlich and Temkin isotherm model constants for $Cu^{2+}$ adsorption.

| Langmuir isotherm model | | | |
|---|---|---|---|
| Cross-linked polyelectrolyte | $Q_m$ (mg g$^{-1}$) | $b$ (L mg$^{-1}$) | $R^2$ |
| CAPE 6 | 0.497 | 2.93 | 0.9697 |
| CAPE 9 | 0.443 | 129 | 0.9910 |

| Freundlich isotherm model | | | |
|---|---|---|---|
| Cross-linked polyelectrolyte | $k_f$ ( mg$^{1-1/n}$ g$^{-1}$ L$^{1/n}$ ) | $n$ | $R^2$ |
| CAPE 6 | 0.537 | 1.44 | 0.9998 |
| CAPE 9 | 1.64 | 2.27 | 0.9734 |

| Temkin isotherm model | | | |
|---|---|---|---|
| Cross-linked polyelectrolyte | $A$ (L g$^{-1}$) | $B$ (J/mol) | $R^2$ |
| CAPE 6 | 36.9 | 0.0944 | 0.9597 |
| CAPE 9 | 1753 | 0.0853 | 0.9615 |

*Fig. 13*

The $R_L$ values based on the Langmuir isotherm model and %$Cu^{2+}$ removal at different initial concentration

| $C_o$ (mg L$^{-1}$) | CAPE 6 | | CAPE 9 | |
|---|---|---|---|---|
| | $R_L$ value | %$Cu^{2+}$ removal | $R_L$ value | %$Cu^{2+}$ removal |
| 0.200 | 0.631 | 77.5 | 0.0373 | 99.4 |
| 0.400 | 0.460 | 73.8 | 0.0190 | 98.7 |
| 0.600 | 0.363 | 70.7 | 0.0128 | 98.3 |
| 0.800 | 0.299 | 67.9 | 0.00960 | 97.9 |
| 1.000 | 0.254 | 64.7 | 0.00769 | 95.2 |

*Fig. 14*

Thermodynamic Data for $Cu^{2+}$ adsorption.

| Cross-linked polyelectrolyte | Temperature (K) | $\Delta G$ (kJ/mol) | $\Delta H$ (kJ/mol) | $\Delta S$ (kJ/mol) | $R^2$ |
|---|---|---|---|---|---|
| CAPE 6 | 298 | +1.13 | 7.06 | 19.9 | 0.9644 |
|  | 306 | +0.967 |  |  |  |
|  | 324 | +0.608 |  |  |  |
| CAPE 9 | 298 | -7.61 | 10.8 | 61.9 | 0.9993 |
|  | 306 | -8.11 |  |  |  |
|  | 324 | -9.22 |  |  |  |

*Fig. 15*

Comparison of metals concentration from Water treatment plant sample (Doha, Saudi Arabia) before and after adding the polymer.

| Metal | Original sample #1 (µg L⁻¹) | CAPE 6 (After treatment) (µg L⁻¹) | CAPE 9 (after treatment) (µg L⁻¹) |
|---|---|---|---|
| Co | 0.34 ± 0.09 | <MDL | 0.12 ± 0.09 |
| Cu (spiked) | 1180 ± 0.063 | <MDL | 109 ± 0.063 |
| Zn | 75.05 ± 0.024 | <MDL | 56.52 ± 0.024 |
| As | 6.388 ± 0.024 | 0.555 ± 0.024 | <MDL |
| Sr | 6526 ± 0.099 | 3651 ± 0.099 | 3774 ± 0.099 |
| Mo | 14.14 ± 0.018 | 10.58 ± 0.018 | 9.081 ± 0.018 |
| Cd | <0.015 | <0.015 | <0.015 |
| Sb | <0.012 | <0.012 | <0.012 |
| Pb | <0.018 | <0.018 | <0.018 |

Mean and standard deviation of three replicates (n = 3).
± values are the method detection limit (MDL), 3 σ of the blank sample.

*Fig. 16*

Comparison of metals concentration from Petrochemical plant sample (Dhahran, Saudi Arabia) before and after adding the polymer.

| Metal | Original sample #2 (µg L$^{-1}$) | CAPE 6 (after treatment) (µg L$^{-1}$) | CAPE 9 (after treatment) (µg L$^{-1}$) |
|---|---|---|---|
| Co | 0.162 ± 0.009 | 0.002 ± 0.009 | 0.08 ± 0.009 |
| Cu (spiked) | 870 ± 0.063 | <MDL | <MDL |
| Zn | 10.04 ± 0.024 | <MDL | 7.7 ± 0.024 |
| As | 2.795 ± 0.024 | <MDL | 0.464 ± 0.024 |
| Sr | 5346 ± 0.099 | 3581 ± 0.099 | 4084 ± 0.099 |
| Mo | 7.546 ± 0.018 | 6.315 ± 0.018 | 6.673 ± 0.018 |
| Cd | <0.015 | <0.015 | <0.015 |
| Sb | 0.097 ± 0.012 | 0.06 ± 0.012 | 0.061 ± 0.012 |
| Pb | <0.018 | <0.018 | <0.018 |

Mean and standard deviation of three replicates (n = 3).
± values are the method detection limit (MDL), 3 σ of the blank sample.

*Fig. 17*

CROSS-LINKED POLYAMINOCARBOXYLATES FOR THE REMOVAL OF METAL IONS FROM AQUEOUS SOLUTIONS

BACKGROUND OF THE INVENTION

1. Field of the Invention

The present invention relates to polyaminocarboxylates that are cross-linked anionic polyelectrolytes (CAPE), and particularly to cross-linked polyaminocarboxylates for the removal of metal ions from aqueous solutions.

2. Description of the Related Art

Removal of toxic metal ions is a matter of great importance due to their negative effects on the environment and human health. Nonbiodegradable $Cu^{2+}$ ions, in typical concentrations of several thousand ppm to less than 1 ppm, are produced as waste in various chemical industries, such as smelting, mining, printed circuit board manufacturing, electroplating, wire drawing, copper polishing, and paint manufacturing. The accumulation of copper in the human body can cause a variety of diseases and disorders. High intake of copper can be fatal. A concentration of 1.3 ppm can cause immediate effects on infants and adults in the form of vomiting, diarrhea, nausea; at higher concentrations. For infants, it can cause liver and kidney damage. According to WHO standards, the maximum allowable concentration of copper in drinking water is 0.2 mg/L, while it is 0.2 and less than 2 ppm for agricultural irrigation and pond fish farming, respectively. In order to protect humans and the environment, it is of utmost importance to remove copper ions from the environment.

Various techniques, such as adsorption, precipitation, dialysis, ion exchange, reverse osmosis, and extraction, have been developed in the past for the removal of metal contaminants from water resources. One of the most attractive among these techniques is the adsorption process due to the availability of different types of low-cost and environmentally friendly adsorbents. Inorganic/organic polymer hybrid adsorbents have been widely investigated. Their efficacy in metal ion removal is attributed to the formation of a stronger chemical bonding between $M^{n+}$ and, for instance, amine motifs in the hybrid materials. Recently, researchers have focused on the syntheses of zwitterionic cross-linked inorganic/organic hybrid materials for the removal of heavy metal ions via electrostatic effects.

There are many sorbent materials to remove larger concentration of metal ions. However, it remains challenging to develop new materials for removing copper ions at ppb-levels. Thus, cross-linked polyaminocarboxylates for the removal of metal ions from aqueous solutions solving the aforementioned problems is desired.

SUMMARY OF THE INVENTION

The cross-linked polyaminocarboxylates for the removal of metal ions from aqueous solutions are cross-linked polyelectrolytes (CAPE) that have the formula:

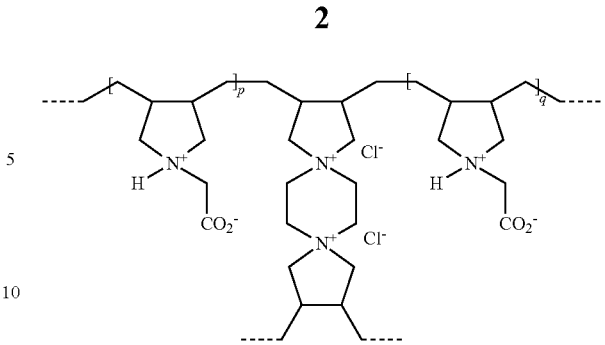

or the formula:

and salts thereof.

The two novel cross-linked anionic polyelectrolytes, designated CAPE 6 and CAPE 9, contain pH-responsive amino acid residues that have been synthesized via cycloco-polymerization and ter-polymerization of a diallylammonioethanoate monomer (90 mol %) and a cross-linker 1,1,4,4-tetraallylpiperazinium dichloride (10 mol %) in the absence of $SO_2$ (forming CAPE 6) and in the presence of $SO_2$ (forming CAPE 9).

These and other features of the present invention will become readily apparent upon further review of the following specification and drawings.

BRIEF DESCRIPTION OF THE DRAWINGS

FIG. 11 is a table showing the ICP-MS instrumental operating parameters for an ICP-MS XSERIES-II Thermo Scientific.

FIG. 12 is a table showing Lagergren second-order kinetic model parameters for $Cu^{+2}$ adsorption by CAPE 6 and CAPE 9 cross-linked polyaminocarboxylates for the removal of metal ions from aqueous solutions according to the present invention.

FIG. 13 is a table showing Langmuir, Freundlich and Temkin isotherm model constants for $Cu^{+2}$ adsorption by CAPE 6 and CAPE 9 cross-linked polyaminocarboxylates for the removal of metal ions from aqueous solutions according to the present invention.

FIG. 14 is a table showing $R_L$ values based on the Langmuir isotherm model and %$Cu^{+2}$ removal at different initial concentration for CAPE 6 and CAPE 9 cross-linked polyaminocarboxylates for the removal of metal ions from aqueous solutions according to the present invention.

FIG. 15 is a table showing thermodynamic data for $Cu^{+2}$ adsorption for CAPE 6 and CAPE 9 cross-linked polyaminocarboxylates for the removal of metal ions from aqueous solutions according to the present invention.

FIG. 16 is a table showing a comparison of metals concentration from a water treatment plant sample (Doha, Saudi Arabia) before and after adding CAPE 6 and CAPE 9 cross-linked polyaminocarboxylates for the removal of metal ions from aqueous solutions according to the present invention.

FIG. 17 is a table showing a comparison of metals concentration from a petrochemical plant sample (Dhahran, Saudia Arabia) before and after adding CAPE 6 and CAPE 9 cross-linked polyaminocarboxylates for the removal of metal ions from aqueous solutions according to the present invention.

DETAILED DESCRIPTION OF THE PREFERRED EMBODIMENTS

The cross-linked polyaminocarboxylates for the removal of metal ions from aqueous solutions are cross-linked polyelectrolytes (CAPE) that have the formula:

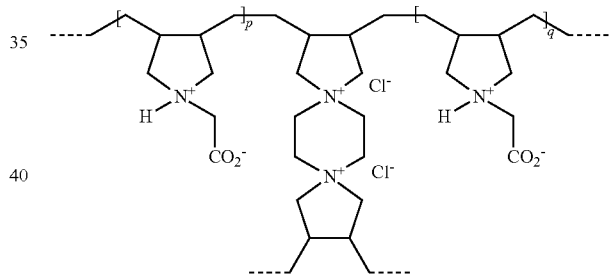

or the formula:

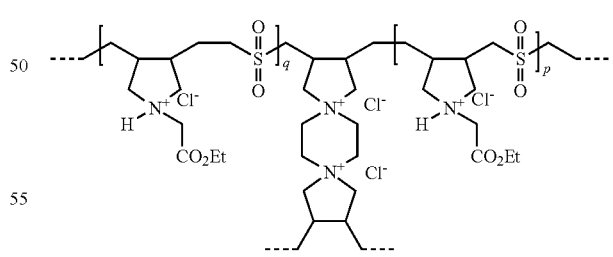

and salts thereof.

The two novel cross-linked anionic polyelectrolytes, designated CAPE 6 and CAPE 9, contain pH-responsive amino acid residues that have been synthesized via cycloco-polymerization and ter-polymerization of a diallylammonioethanoate monomer (90 mol %) and a cross-linker 1,1,4,4-tetraallylpiperazinium dichloride (10 mol %) in the absence of $SO_2$ (forming CAPE 6) and in the presence of $SO_2$ (forming CAPE 9). For the sorbents CAPE 6 and CAPE 9, the efficiency of Cu²⁺ removal at an initial metal concentration of 200 ppb was found to be 77.5% and 99.4%, respectively. Treatment of real wastewater samples spiked with $Cu^{2+}$ ions showed the excellent ability of the resins to adsorb metal ions.

The cross-linked polyaminocarboxylates were synthesized and tested using the following apparatus. Elemental analysis was carried out on a Perkin Elmer Elemental Analyzer Series II Model 2400. IR spectra were recorded on a Perkin Elmer 16F PC FTIR spectrometer. $^1H$ and $^{13}C$ spectra were measured on a JEOL LA 500 MHz spectrometer using HOD signal at δ64.65 and dioxane signal at 67.4 ppm as internal standards, respectively. Scanning electron microscopy images were taken by TESCAN LYRA 3 (Czech Republic) equipped with Oxford, energy-dispersive X-ray spectroscopy (EDX) detector model X-Max. Inductively coupled plasma analysis was performed on ICP-MS XSERIES-II (Thermo Scientific). Thermogravimetric analysis (TGA) was performed using a thermal analyzer (STA 429) manufactured by Netzsch (Germany). The polymer sample to be tested (usually ~5 mg) was placed in a platinum crucible. Aluminum oxide ($Al_2O_3$; ~4 mg) was placed in an identical platinum crucible as a reference sample. With the sample carrier system, which had two sets of 10% Pt—Pt/Rh thermocouples, the sample carrier was placed in the middle of the vertical furnace, which was programmed and controlled by a microprocessor temperature controller. The temperature was raised at a uniform rate of 10° C./min. The analyses were made over a temperature range of 20-800° C. in an air atmosphere flowing at a rate of 100 mL/min.

Azoisobutyronitrile (AIBN) from Fluka AG was purified by crystallization from a chloroform-ethanol mixture. Diallylamine, t-butylhydroperoxide (TBHP) (70% aqueous solution), from Fluka Chemie AG (Buchs, Switzerland) were used as received. All solvents used were of analytical grade.

Example 1

Ethyl diallylaminoethanoate (Amine 1)

Amine 1 was prepared as described in H. A. Al-Muallem et al., Polymer 43, (2002), 1041-1050, which is hereby incorporated by reference in its entirety.

Example 2

Sodium diallylaminoethanoate (Monomer 2)

Figure 1:
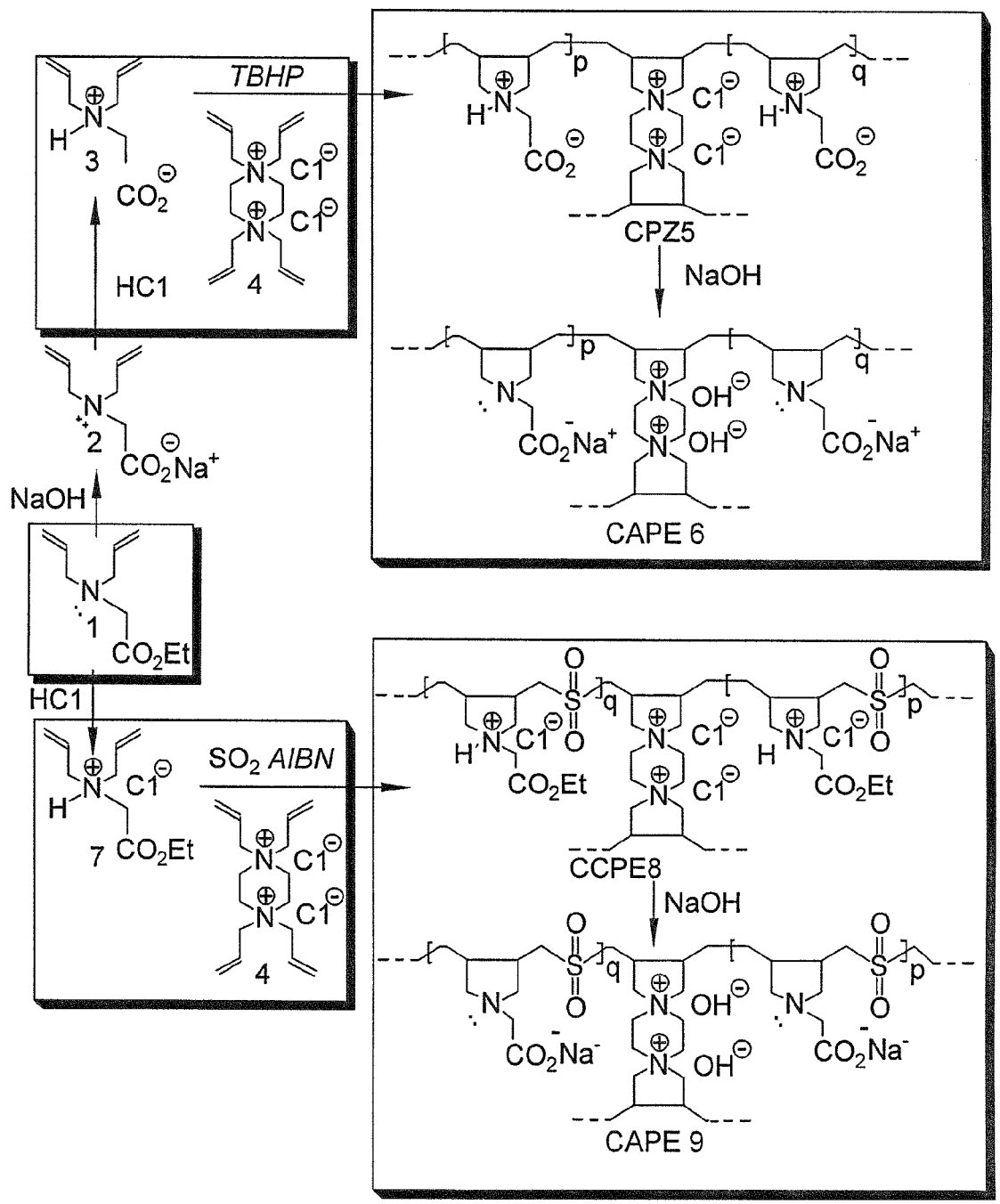
FIG. 1 is a reaction scheme for the synthesis of Monomers 2, 3 and 7 and cross-linked polymers CPZ 5, CCPE 8, CAPE 6 and CAPE 9, CAPE 6 and CAPE 9 being cross-linked polyaminocarboxylates for the removal of metal ions from aqueous solutions according to the present invention.

As referred to in the synthesis scheme of FIG. 1, a mixture of Amine 1 (50.0 g, 0.273 mol) and sodium hydroxide (12.4 g, 0.31 mol) in methanol (100 ml) was stirred at 20° C. for 24 h to form Monomer 2. After removal of the solvent, the residual solid was washed with ether and dried under vacuum at 55° C. to a constant weight (45.3 g, 94%). Mp 295-297° C.; (Found: C, 54.0; H, 6.9; N, 7.7%. $C_8H_{12}NNaO_2$ requires C, 54.23; H, 6.83; N, 7.91%); $v_{max}$ (KBr) 3334 (hygroscopic), 2875, 2814, 1594, 1436, 1408, 1353, 1326, 1290, 1254, 1157, 1107, 994, 914, 875, 720, 657, 629, 597, 528 and 441 $cm^{-1}$; $\delta_H$ ($D_2O$) 2.99 (2H, s), 3.09 (4H, d, J 7.1 Hz), 5.11 (4H, m) and 5.75 (2H, m); $\delta_c$ ($D_2O$) 56.91, 57.26 (2C), 120.04 (2C, =CH$_2$), 134.96 (2C, CH=) and 179.61. $^{13}C$ spectral assignments were supported by DEPT 135 NMR analysis.

Example 3

Diallylammonioethanoate (Monomer 3)

As referred to in the synthesis scheme of FIG. 1, concentrated HCl (20 mL, 0.24 mol) was added dropwise (ca. 5 min) to a solution of Amine 2 (40 g, 0.23 mol) in water (30 mL). The mixture was then freeze dried, and the residual solid was dissolved in ethanol (45 ml). The precipitated NaCl was filtered off washed with a 1:1 ethanol/ether mixture. Removal of the solvents followed by drying at 55° C. under vacuum to a constant weight afforded the zwitterionic monomer 3 (32 g, 90%). Mp 85-89° C. closed capillary; (Found: C, 61.6; H, 8.6; N, 8.7%. $C_8H_{13}NO_2$ requires C, 61.91; H, 8.44; N, 9.03%); $v_{max}$ (KBr) 3450 (w), 3080, 3015, 2846, 1734, 1647, 1449, 1420, 1394, 1339, 1271, 1228, 1154, 1068, 998, 951, 885, 794, 678, 621, 559 and 453 $cm^{-1}$, $\delta_H$ ($D_2O$) 3.54 (2H, s), 3.69 (4H, br, s), 5.45 (4H, m) and 5.81 (2H, m); $\delta_c$ ($D_2O$) 55.03, 57.48 (2C), 126.63 (2C, CH=), 127.42 (2C, =CH$_2$) and 171.33. $^{13}C$ spectral assignments were supported by DEPT 135 NMR analysis.

Example 4

1,1,4,4-tetraallylpiperazinium dichloride (Monomer 4)

Monomer 4, a cross-linker, was prepared as described in S. A. Ali et al., J. Appl. Polym. Sci., 61, (1996), 1077-1085, which is hereby incorporated by reference in its entirety.

Example 5

N,N-diallyl-N-carboethoxymethylammonium chloride (Monomer 7)

Monomer 7 was prepared as described in H. A. Al-Muallem et al., Polymer 43, (2002), 1041-1050, which is hereby incorporated by reference in its entirety.

Example 8

Copolymerization of Monomer 3 and Monomer 4 to form Cross-Linked Polyzwitterion (CPZ 5)

As referred to in the synthesis scheme of FIG. 1, the initiator tertiary-butyl hydroperoxide (TBHP) (610 mg) was added to a homogeneous mixture of monomer 3 (8.0 g, 51.5 mmol) and cross-linker 4 (1.82 g, 5.7 mmol) in water (5.29 g). The reaction mixture under $N_2$ in the closed flask was stirred using a magnetic stir-bar at 87° C. for 24 h. Within 3-5 h, the magnetic stir-bar stopped moving; the reaction mixture became a transparent swollen gel. At the end of the elapsed time, the swelled gel of the CPZ 5 was soaked in water (48 h), with replacement of water several times. The swelled gel was then poured onto acetone. The resin was filtered and dried under vacuum at 70° C. to a constant weight (5.6 g, 57%). (Found: C, 61.1; H, 8.6; N, 8.8%. Monomer 3 $C_8H_{13}NO_2$ (90 mol %) and monomer 4 $C_{16}H_{28}Cl_2N_2$ (10 mol %) requires C, 61.73; H, 8,48; N, 9.00%); $v_{max}$ (KBr) 3455, 2966, 1715, 1632, 1466, 1402, 1224, 1135, 1051, 973, 910, 794, 685 and 529 $cm^{-1}$.

Example 9

Basification of CPZ 5 to form Cross-Linked Anionic Polyelectrolyte (CAPE 6)

As referred to in the synthesis scheme of FIG. 1, a mixture of CPZ 5 (4.04 g, ~23.5 mmol) and a solution of NaOH (1.88 g, 47 mmol) in water (100 mL) was stirred at room temperature for 24 h to form CAPE 6. CAPE 6 was dropped onto methanol (200 ml) and allowed to soak in it for 5 h, after which it was filtered and dried under vacuum at 65° C. to a constant weight (3.1 g, 70%). TGA analysis shows initial decomposition begins around 200° C.

Example 10

Terpolymerization of Monomer 4, Monomer 7, and Sulfur Dioxide to form Cross-Linked Cationic Polyelectrolyte (CCPE 8)

As referred to in the synthesis scheme of FIG. 1, sulfur dioxide (1.92 g, 30 mmol) was absorbed in a mixture of monomer 7 (5.93 g, 27 mmol) and cross-linker 4 (3.0 mmol, 0.96 g) in DMSO (6.0 g). Initiator AIBN (150 mg) was then added, and the mixture was stirred at 65° C. for 48 h, during which it became viscous. At the end of the elapsed time, the viscous product (CCPE 8) was soaked in water for 24 h, with frequent changing of water, and finally freeze-dried (6.34 g, 72%). (Found: C, 42.8; H, 6.6; N, 4.9; S, 10.7%). A terpolymer from monomer 7 $C_{10}H_{18}ClNO_2$ (90 mol %) and monomer 4 $C_{16}H_{28}Cl_2N_2$ (10 mol %) and $SO_2$ (100 mol %) requires C, 43.11; H, 6.49; N, 5.18; S, 11.01%); $v_{max}$ (KBr) 3442, 2984, 1746, 1634, 1465, 1408, 1308, 1232, 1123, 1017, 850, 770 and 507 cm$^{-1}$.

Example 11

Ester Hydrolysis of CCPE 8 to Form Cross-linked Anionic Polyelectrolyte (CAPE 9)

As referred to in the synthesis scheme of FIG. 1, a mixture of CCPE 8 (5.07 g, 17.3 mmol) and sodium hydroxide (40 mmol, 1.6 g) in water (150 ml) was stirred for 24 h, after which it was poured onto excess methanol. The resin (CAPE 9) was filtered and dried under vacuum at 45° C. to a constant weight (3.4 g, 77%). TGA analysis shows initial decomposition around 200° C.

Example 12

Sample Characterizations

FT-IR spectra were recorded on a Perkin Elmer 16F PC FTIR spectrometer in the region of 4000-400 cm$^{-1}$. Thermal gravimetric analysis (TGA) was conducted to measure the thermal stability of the CAPE 6 and CAPE 9 and examine the modes of decomposition. SEM and EDX images show the morphology and the existence of copper adsorbed on both the cross-linked polymers.

Example 13

Adsorption Experiments

The procedure for the adsorption experiments of the cross-linked polymer CAPE 6 for $Cu^{2+}$ ions can be described briefly as follows. A mixture of CAPE 6 (50 mg) in an aqueous $Cu(NO_3)_2$ solution (20 mL) having 1 mg L$^{-1}$ of $Cu^{2+}$ ions was stirred using a magnetic stir-bar at different pH for 24 h. The resin was filtered and carefully washed with deionized water. The combined filtrate was analyzed by ICP-MS to determine the amount of $Cu^{2+}$ that remained. The adsorption capacity ($q_{Cu^{2+}}$) in mg g$^{-1}$ can be calculated using Eq. (1):

$$q_{Cu^{2+}} = \frac{(C_0 - C_f)V}{W} \quad (1)$$

where $C_0$ and $C_f$ are the initial and final concentration of $Cu^{2+}$ ions in mg/L, respectively, W is the weight of the polymer in grams, and V is the volume of the solution in Liters. Data presented are average of triplicate runs and varied by less than 4% in all the cases studied.

For adsorption kinetic studies, the resin sample was stirred in a 1 mg L$^{-1}$ $Cu(NO_3)_2$ solution for different adsorption times at a preferred pH. The adsorption isotherm was constructed by changing the concentration of $Cu(NO_3)_2$ solution from 200 µg L$^{-1}$ (i.e., 0.2 ppm) to 1000 µg L$^{-1}$ (i.e. 1 ppm) at 25° C. for 24 h. Based on the adsorption data from experiments carried out at different temperatures, the activation energy for the adsorption process and thermodynamic parameters $\Delta G$, $\Delta H$ and $\Delta S$ for $Cu^{2+}$ removal were calculated. Real samples of wastewater treatment plants were tested to examine the ability of the cross-linked polymers to adsorb heavy metals.

Example 14

QA/QC

Quality control for metal analyses included repeated injections and periodic (two in every 2-h operation of the equipment) analysis of standard solution (Instrumental parameters are found in FIG. 11). A prior set of samples was rerun if the analyzed value differed from the standard solution value by >10%. The relative standard deviation among replicate determinations was typically ≤5%.

The results of the above examples will now be discussed. With respect to the synthesis of cross-linked anionic polyelectrolytes CAPE 6 and CAPE 9, Butler's cyclopolymerization protocol has been utilized to synthesize the current resins CAPE 6 and CAPE 9 as shown in FIG. 1. Butler's pioneering discovery of the cyclopolymerization involving a variety of N,N-diallylammonium salts has led to the synthesis of an array of scientifically and technologically important water-soluble cationic polyelectrolytes. The polymer-architecture, having the five-membered cyclic units embedded in the backbone, has been recognized as the eighth major structural type of synthetic polymer. Over 33 million pounds of poly(diallyldimethylammonium chloride) alone are sold annually for water treatment, and another 2 million pounds are used for personal care formulations.

Monomer 3 (90 mol %) and Monomer 4 (10 mol %) underwent cyclocopolymerization in the presence of initiator TBHP to give the novel cross-linked polyzwitterion CPZ 5, as shown in FIG. 1. Elemental analysis of the CPZ 5 revealed the incorporation of monomers 3 and 4 in an approximate molar ratio of 90:10, which is the same as the feed ratio. CPZ 5 was found to swell in water, while it shrank upon soaking in acetone owing to the removal of water. Its basification with excess NaOH led to cross-linked anionic polyelectrolyte CAPE 6.

Cationic Monomer 7 (90 mol %), Monomer 4 (10 mol %), and sulfur dioxide (100 mmol %), in DMSO as a solvent, underwent terpolymerization in the presence of initiator AIBN to give the novel cross-linked cationic polyelectrolyte CCPE 8, as shown in FIG. 1. Elemental analysis of CCPE 8 revealed the incorporation of monomers 7 and 4 in an approximate molar ratio of 90:10, which is the same as the feed ratio. CCPE 8 was found to swell in water, while it shrank upon soaking in acetone owing to the removal of water. Treatment of CCPE 8 with excess NaOH led to the hydrolysis of the ester groups to form cross-linked anionic polyelectrolyte CAPE 9.

The thermogravimetric analysis (TGA) curve of CAPE 6 showed two major losses in the weight. The first slow weight loss of 24.2% is attributed to the decarboxylation of the pendant carboxylate groups. The second major loss of 70.2% is the result of combustion of a nitrogenated organic fraction with the release of $CO_2$, NO and $H_2O$ gases. The residual mass at 800° C. was found to be 5.6%. For CAPE 9, TGA analysis showed three major losses in the weight. The first sharp loss of 14.4%, the second slow loss of 39.0%, and the third slow loss of 21.0% are attributed to the loss of $SO_2$, the decarboxylation of the pendant carboxylate groups, and the decomposition of the nitrogenated organic fraction, respectively. The residual mass at 800° C. was found to be 25.6%.

Figure 4:
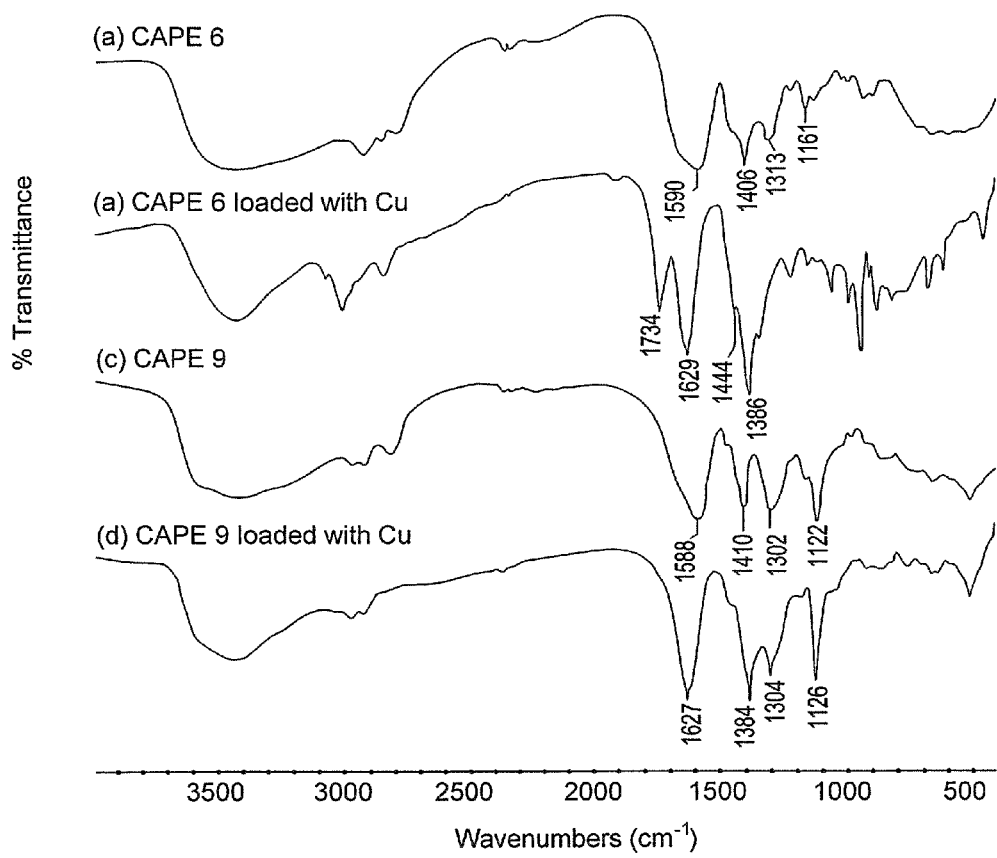
FIG. 4 is the IR spectra for CAPE 6 and CAPE 9 cross-linked polyaminocarboxylates for the removal of metal ions from aqueous solutions according to the present invention, shown unloaded and loaded with copper.

The IR bands in the spectrum ((a) of FIG. 4) of CAPE 6 in the region of 1406 and 1590 $cm^{-1}$ are attributed to the stretching vibrations of C—O and C=O of the $CO_2^-$ groups, respectively, and the band at 3421 $cm^{-1}$ is due to the stretching vibration of the —OH group. The IR spectra of the loaded CAPE 6 ((b) of FIG. 4) showed an increase in the broadness and intensity of the C—O band. The shifting of the C=O band to a higher wave number (1629 $cm^{-1}$) may be attributed to the increase in the covalent character of the copper oxygen bond (C—O—Cu) which, in turn, increases the double bond character of C=O. The appearance of new strong bands at 1734 and 1386 is attributed to the presence of C=O of the C(=O)OH and the ionic nitrate group, respectively. The latter absorption band is possible, since the adsorption process was carried out in the presence of copper nitrates.

The bands in the IR spectra of CAPE 9 ((c) of FIG. 4) in the region of 1410 and 1588 $cm^{-1}$ are attributed to the stretching vibrations of C—O$^-$ and C=O of the C(=O)O$^-$ groups, respectively, and the bands in the region of 1122 and 1302 are attributed to the symmetric and asymmetric vibrations of $SO_2$ unit. IR spectra of CAPE 9 ((d) of FIG. 4) loaded with $Cu^{2+}$ revealed the increase in the intensity and broadness of the carboxylate C—O vibrations and the shifting of the C=O band to 1627 as a result of the adsorption of the metal ions. The appearance of a new strong band in the region 1384 is attributed to the presence of an ionic nitrate group, since the adsorption process was carried out in the presence of copper nitrate. Interestingly, the presence of the strong nitrate bands implies the ability of the resin 6 and 9 to act also as an anion exchanger. It is interesting to note the increase in the intensity of the $SO_2$ bands at 1126 and 1304 $cm^{-1}$ in the IR spectra for CAPE 9 loaded with Cu, as shown in (d) of FIG. 4, which could be attributed to the role of $SO_2$ in metal adsorption (S=O—Cu), as shown by the metal complex in FIG. 2C.

Figure 2A:
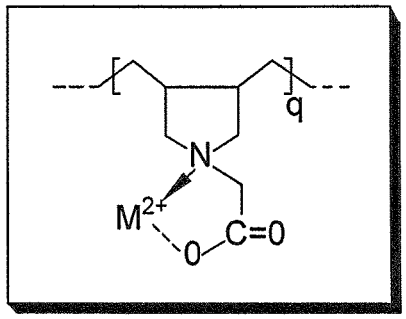
FIG. 2A is a diagram showing the metal complex formed between a heavy metal ion and the amino and carboxylate groups of the CAPE 6 cross-linked polyaminocarboxylate according to the present invention.
Figure 2B:
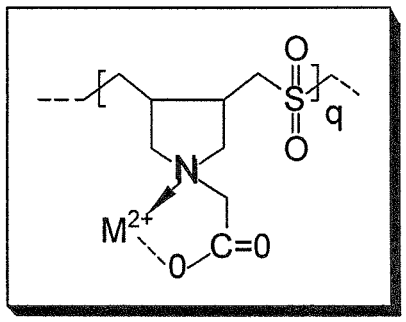
FIG. 2B is a diagram showing the metal complex formed between a heavy metal ion and the amino and carboxylate groups of the CAPE 9 cross-linked polyaminocarboxylate according to the present invention.
Figure 2C:
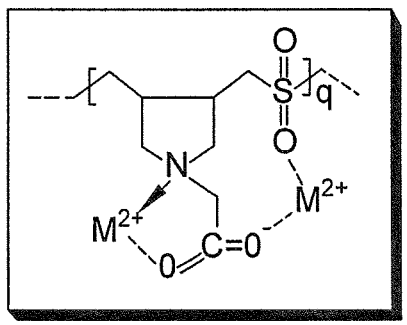
FIG. 2C is a diagram showing the metal complexes formed between a heavy metal ion and the amino, carboxylate, and $SO_2$ groups of the CAPE 9 cross-linked polyaminocarboxylate according to the present invention.
Figure 5A:
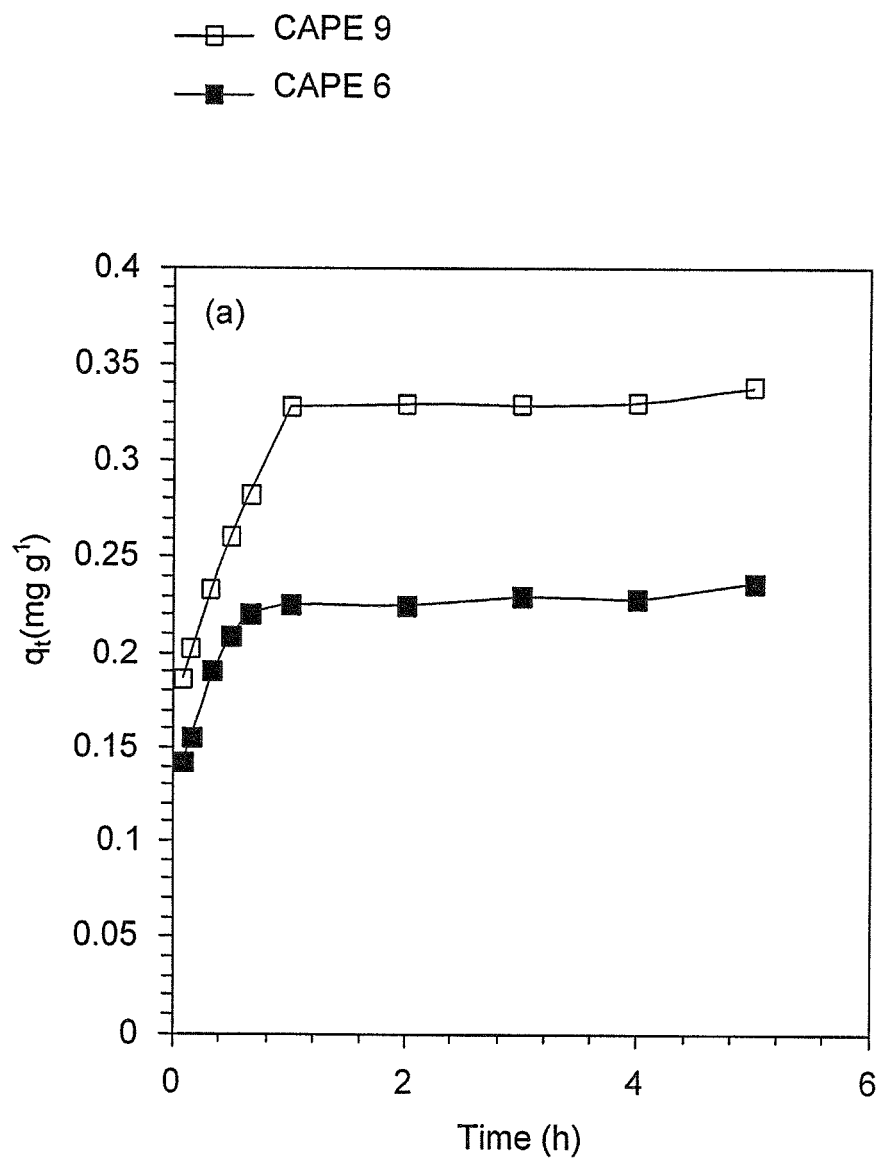
FIG. 5A is a graph showing the effect of time and showing the adsorption capacity for CAPE 6 and CAPE 9 cross-linked polyaminocarboxylates for the removal of metal ions from aqueous solutions according to the present invention.
Figure 5B:
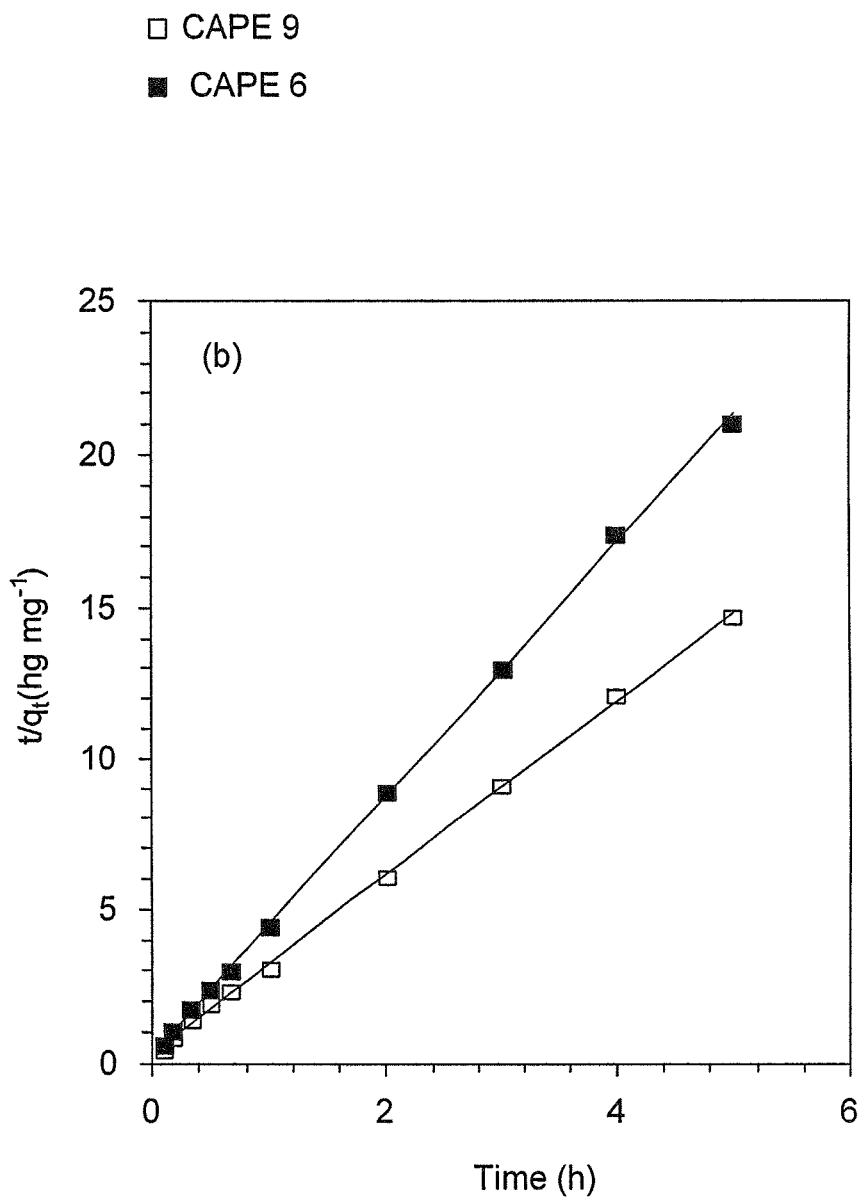
FIG. 5B is a graph showing the Lagergren second order kinetic model for CAPE 6 and CAPE 9 cross-linked polyaminocarboxylates for the removal of metal ions from aqueous solutions according to the present invention.
Figure 5C:
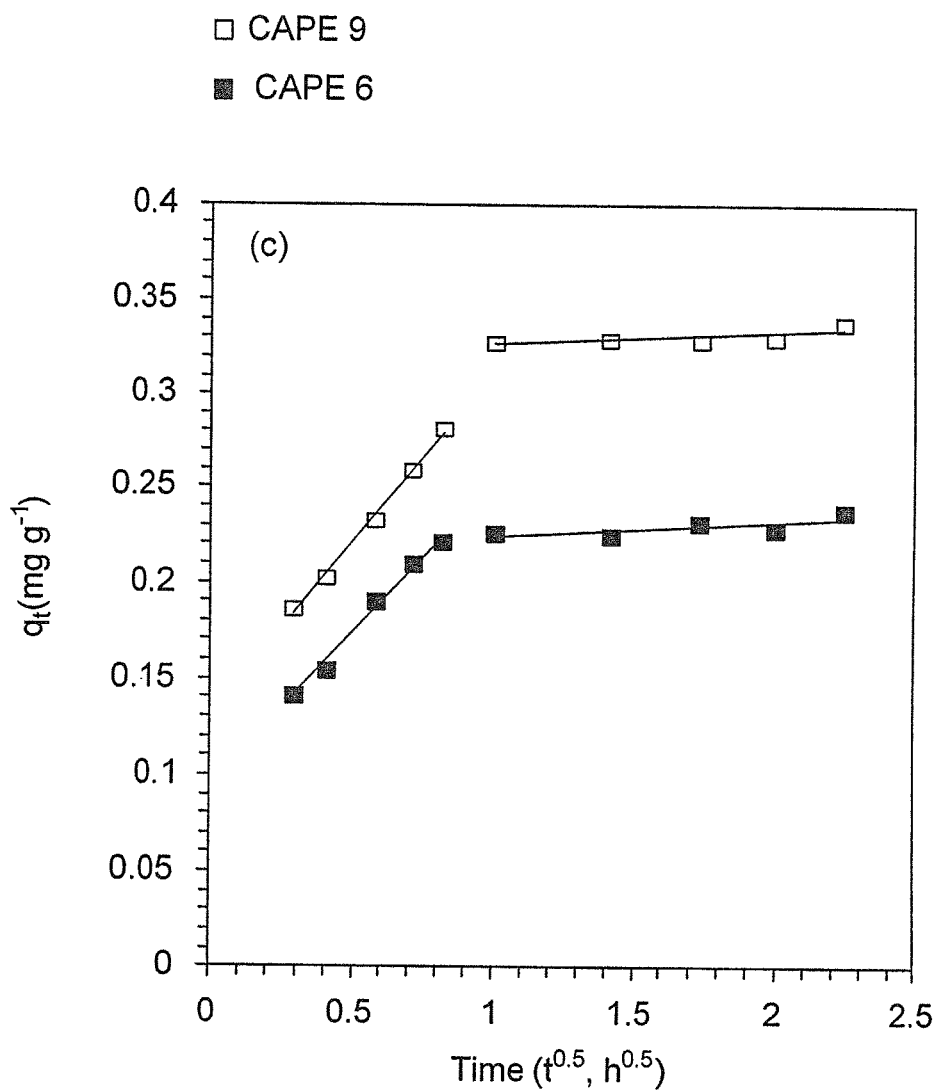
FIG. 5C is a graph showing the intraparticle diffusion model for CAPE 6 and CAPE 9 cross-linked polyaminocarboxylates for the removal of metal ions from aqueous solutions according to the present invention.

The adsorption kinetics, as described by the relationship between adsorption capacity and adsorption time, are presented in FIG. 5A. It was found that the adsorption of $Cu^{2+}$ ions by CAPE 6 and CAPE 9 reached equilibrium within 1 h, indicating the strong ability of these adsorbents to abstract $Cu^{2+}$ ions from aqueous solutions. The higher amount of adsorption by CAPE 9 could be rationalized in terms of the stiffening effect of the sulfur dioxide moieties, making the adsorbent more expanded, and thus allowing it to have greater access to metal ions, and also the ability to complex with Cu ions, as shown by the IR spectrum (FIG. 4) and the metal complexing schemes (FIG. 2A-2C).

It is reported that the Lagergren adsorption kinetic model is a suitable tool to investigate the adsorption properties of a polymer. The following equations (2) and (3) express the linear first-order and second-order kinetic equations for the Lagergren model, respectively:

$$\log(q_e - q_t) = \log q_e - \frac{k_1 t}{2.303} \quad (2)$$

$$\frac{t}{q_t} = \frac{1}{k_2 q_e^2} + \frac{t}{q_e} \quad (3)$$

where $k_1$ and $k_2$ are the first-order and second-order rate constant, respectively, $q_t$ and $q_e$ are the respective adsorption capacity of the metal ions at a time t and at equilibrium e. The adsorption of $Cu^{2+}$ by both the cross-linkers did not fit the first-order Lagergren kinetic model, so the graphs representing the kinetic model have not been displayed. The second-order Lagergren kinetic model (FIG. 3B), however, fitted well for the adsorption of $Cu^{2+}$ on CAPE 6 and CAPE 9, indicating that the adsorption process might be a chemical adsorption. It can be noted in FIG. 12 that both the second-order rate constant ($k_2$) and the initial rate of adsorption (h) of $Cu^{2+}$ ions are higher for sorbent CAPE 9 than CAPE 6, implying the influence of backbone stiffening $SO_2$ units, allowing more open structure of the former resin. Fitted equilibrium capacities ($q_{e,\,cal}$) derived from Eq. (2) are in close agreement with those observed ($q_{e,\,exp}$) experimentally. The experimental data so far revealed that the resin is an efficient adsorbent for the removal of copper ions from aqueous solutions.

The adsorption data may also be described by some adsorption diffusion models, which are always constructed on the basis of three consecutive steps, namely, (1) film diffusion (i.e., diffusion across the liquid film surrounding the adsorbent particles); (2) intraparticle diffusion (i.e., diffusion in the liquid contained in the pores and/or along the pore walls); and (3) mass action (i.e., physical adsorption and desorption between the adsorbate and active sites). Since the adsorption step is very rapid, it is assumed that it does not influence the overall kinetics. The overall rate of the adsorption process, therefore, will be controlled by either surface diffusion or intraparticle diffusion.

Figure 3:
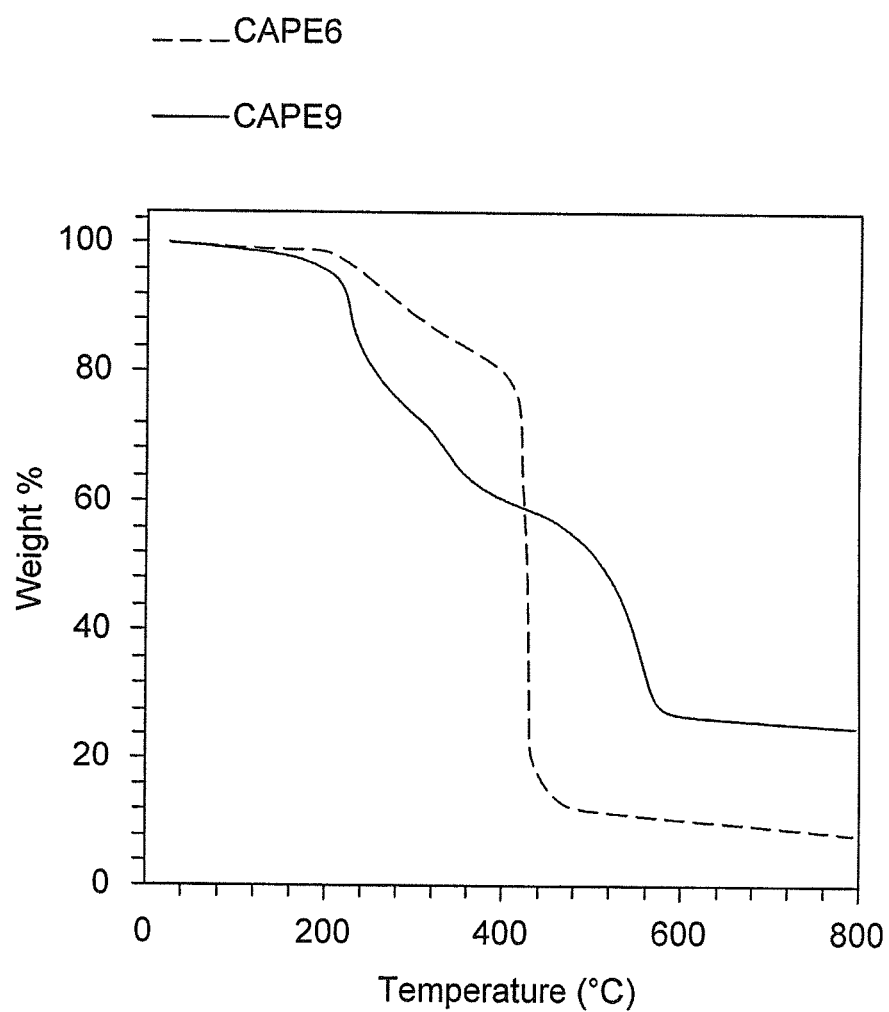
FIG. 3 is a chart showing thermogravimetric analysis (TGA) for the CAPE 6 and CAPE 9 cross-linked polyaminocarboxylates for the removal of metal ions from aqueous solutions according to the present invention.

The intraparticle diffusion model assumes that the metal ions are transported from the solution through an interface between the solution and the adsorbent (i.e., film diffusion), followed by a rate-limiting intraparticle diffusion step, which brings them into the pores of the particles in the adsorbent. The following equation expresses the relation of the adsorption capacity and time:

$$q_t = x_i + k_p t^{0.5} \quad (4)$$

where $q_t$ is the adsorption capacity at time t, $k_p$ is the rate constant of intraparticle diffusion, and $x_i$ is related to boundary layer thickness. According to the Weber-Morris model, a straight line fit for the plot of $q_t$ versus $t^{0.5}$ implies that intraparticle diffusion is the rate-limiting step. If the plot passes through the origin, then it becomes the sole rate-limiting step. Since the initial linear plot did not pass through the origin, intraparticle diffusion within the pores of the resins was not the only rate-limiting step. Thus, adsorption kinetics may be controlled by film diffusion and intraparticle diffusion simultaneously. Note that the second linear section represents the final equilibrium stage. The value of the intercept $x_i$ in the initial linear plots for CAPE 6 and CAPE 9 were found to be 0.0963 mg $g^{-1}$ and 0.131 mg $g^{-1}$, respectively, with the square of regression ($R^2$) as 0.9886 and 0.9910 (FIG. 3C). Larger intercepts (implying a larger thickness for the boundary layer) in the case of CAPE 9 suggest that surface diffusion has a larger role in the rate-limiting step than in the case of CAPE 6. Participation of the $SO_2$ units in CAPE 9 via H-bonding with water presumably helps to have larger boundary layer thickness. The overall larger rate of adsorption of CAPE 9 indicates the greater role of intraparticle diffusion, as it provides a more expanded backbone of CAPE 9 owing to the presence of the backbone-stiffening $SO_2$ motif.

Figure 6A:
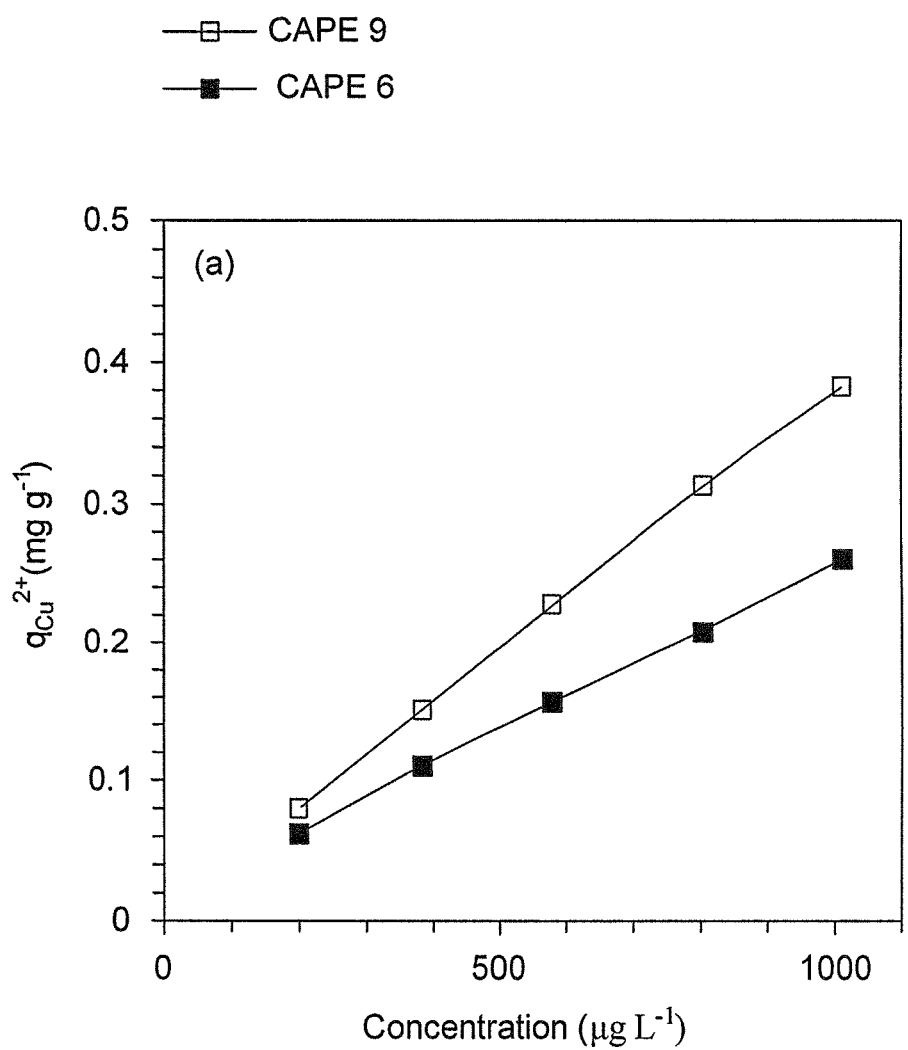
FIG. 6A is a graph showing the effect of concentration on the adsorption capacity for CAPE 6 and CAPE 9 cross-linked polyaminocarboxylates for the removal of metal ions from aqueous solutions according to the present invention.

As shown in FIG. 6A, the adsorption capacity of CAPE 6 and CAPE 9 increases with the increase in the initial concentration of $Cu^{2+}$ ions.

Figure 6B:
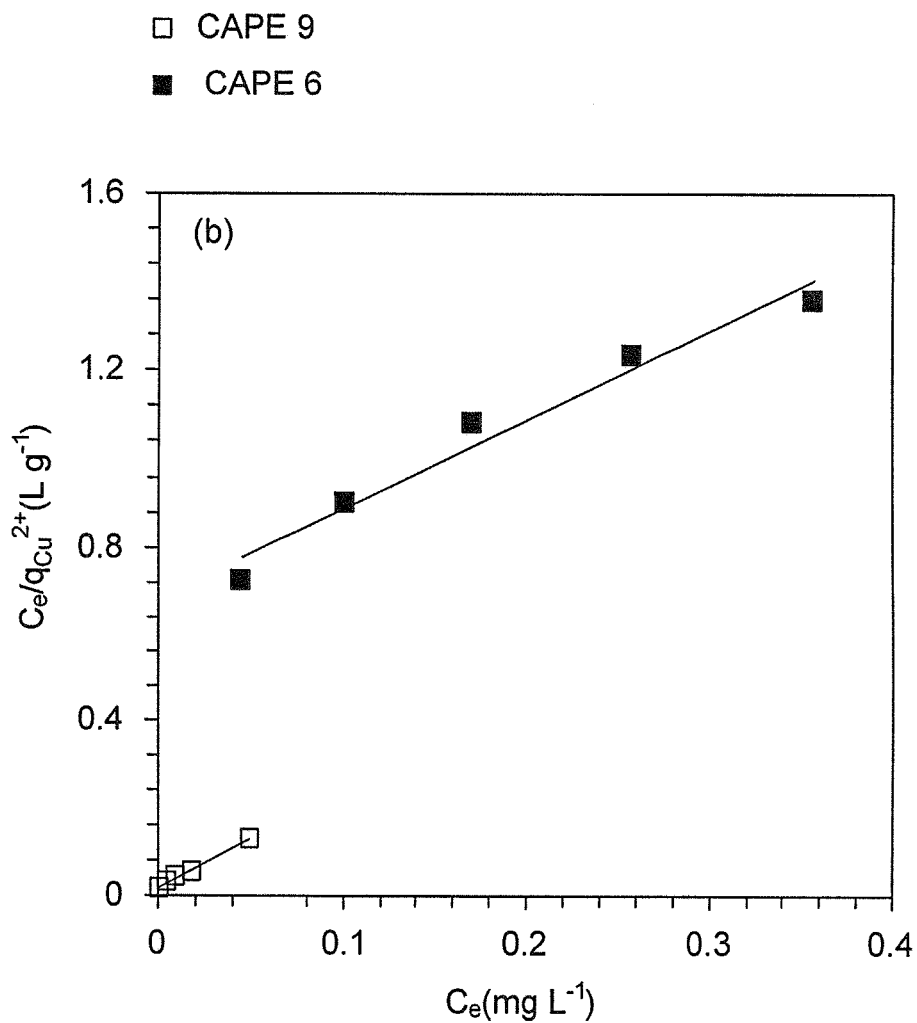
FIG. 6B is a Langmuir plot for CAPE 6 and CAPE 9 cross-linked polyaminocarboxylates for the removal of metal ions from aqueous solutions according to the present invention.

To further explore the adsorption mechanism, Langmuir, Freundlich and Temkin isotherm models were used to analyze the adsorption data. The Langmuir isotherm equation can be expressed by Eq. (5):

$$\frac{C_e}{q_e} = \frac{C_e}{Q_m} + \frac{1}{Q_m b} \quad (5)$$

where $C_e$ and $q_e$ are the concentrations of metal ion in the solution and resin, respectively, and $Q_m$ and b are the Langmuir constants. FIG. 6B illustrates the Langmuir plot of $C_e/q_e$ versus $C_e$, enabling the calculation of Langmuir constants from the intercept and slope of the linear plot. The Langmuir isotherm model assumes the mechanism of the adsorption process as a monolayer adsorption on completely homogeneous surfaces where interactions between adsorbed molecules are negligible. This empirical model assumes the adsorbed layer is one molecule in thickness, so that adsorption can only occur at a fixed number of definite identical and equivalent localized sites. Once a molecule occupies a site, no further adsorption can take place. This is described as homogeneous adsorption with uniform energies of ion exchange, as all sites possess equal affinity for the adsorbate.

Figure 6C:
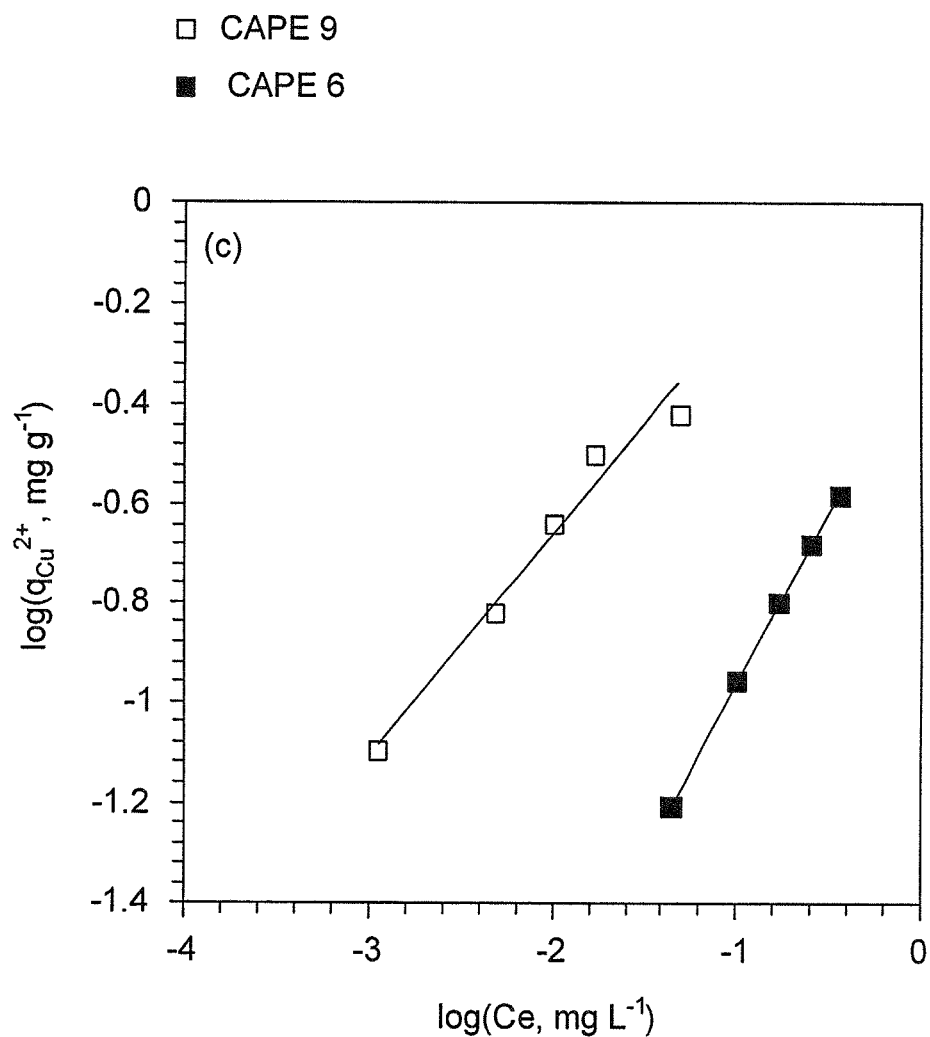
FIG. 6C is a Freundlich plot for CAPE 6 and CAPE 9 cross-linked polyaminocarboxylates for the removal of metal ions from aqueous solutions according to the present invention.

The Freundlich isotherm model, on the other hand, describes the non-ideal adsorption occurring on a heterogeneous surface with uniform energy, as well as multilayer adsorption. Equations (6) and (7) express the model:

$$q_e = k_f C_e^{1/n} \quad (6)$$

$$\log q_e = \log k_f + \frac{1}{n} \log C_e \quad (7)$$

where $q_e$ and $C_e$ are the equilibrium concentrations of metal ion in the adsorbed and liquid phase, respectively, $k_f$ and n represent the Freundlich constants, which can be calculated from the slope and intercept of the linear plot of log $q_e$ versus log $C_e$, as presented in FIG. 6C. The values of n were determined to be 1.44 and 2.27 for CAPE 6 and 9, respectively. Values lying in the range of 1 to 10 are considered for classification as favorable adsorption. The slope (1/n) range of 0-1 is known to be a measure of adsorption intensity or surface heterogeneity, becoming more heterogeneous as its value gets closer to zero. A 1/n value below unity (0.693, 0.441 for CAPE 6 and CAPE 9, respectively) is indicative of chemisorption process, whereas 1/n above one implies cooperative adsorption. For CAPE 9, the higher value of the constant $k_f$, which is related to adsorption capacity (q), and indicates the higher affinity for the metal ion in comparison to CAPE 6.

The Temkin isotherm equation assumes that the heat of adsorption of all the molecules in a layer decreases linearly with coverage due to adsorbent-adsorbate interactions, and that the adsorption is characterized by a uniform distribution of the bonding energies up to some maximum binding energy. The Temkin isotherm has been used in the following form:

$$q_e = \frac{RT}{b} \ln(aC_e) \quad (8)$$

Figure 6D:
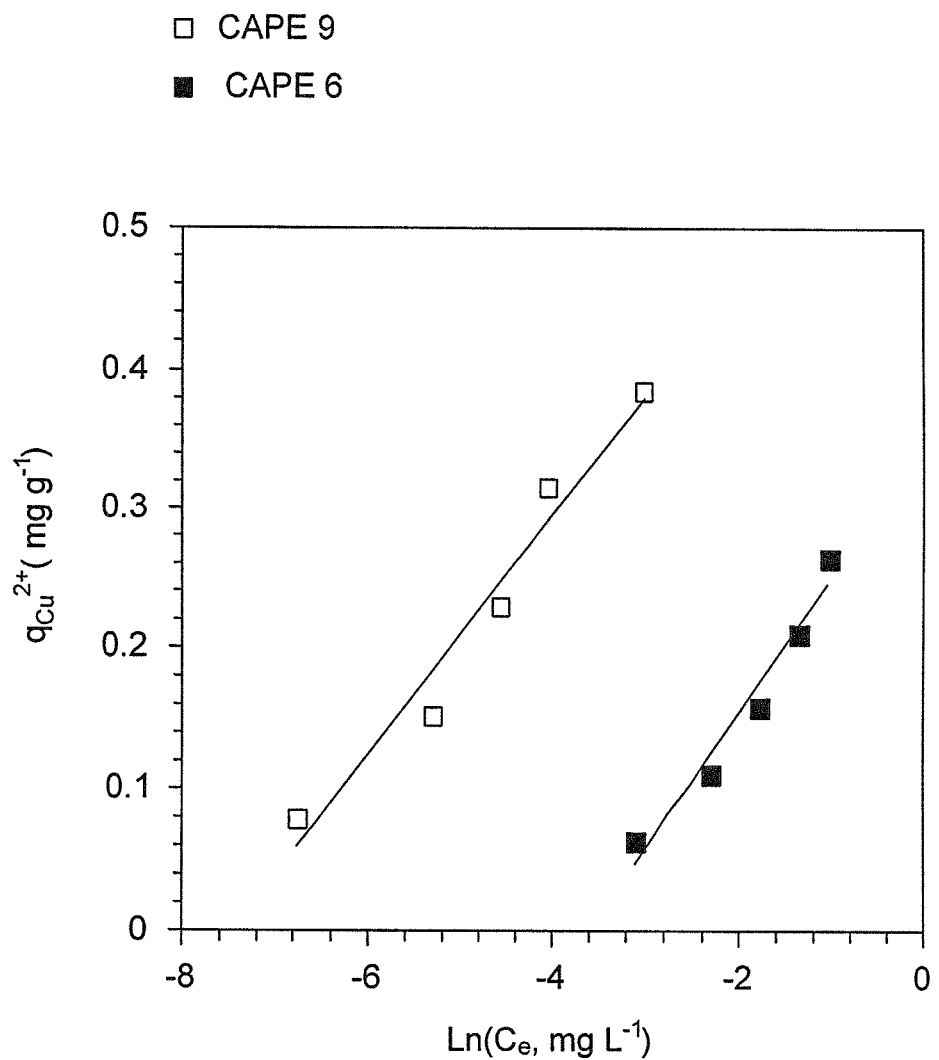
FIG. 6D is a Temkin plot for CAPE 6 and CAPE 9 cross-linked polyaminocarboxylates for the removal of metal ions from aqueous solutions according to the present invention.

A linear form of the Temkin isotherm can be expressed as:

$$q_e = \frac{RT}{b} \ln A + \frac{RT}{b} \ln C_e \quad (9)$$

$$q_e = B \ln A + B \ln C_e \quad (10)$$

where R is the gas constant (8.314 J mol$^{-1}$ K$^{-1}$), T is temperature (K), A is the equilibrium binding constant (L/g) corresponding to the maximum binding energy, and constant B=RT/b is related to the heat of adsorption. A plot of $q_e$ versus ln $C_e$ (FIG. 6D) is used to calculate the Temkin isotherm constants A and B. FIGS. 6B-6D illustrate that the adsorption of $Cu^{2+}$ ions by both cross-linkers fitted well with the Langmuir, Freundlich and Temkin isotherm models, thereby implying that the adsorption may occur as a monolayer, as well as a heterogeneous surface adsorption. The Langmuir, Freundlich and Temkin isotherm model constants are given in FIG. 13.

Figure 7:
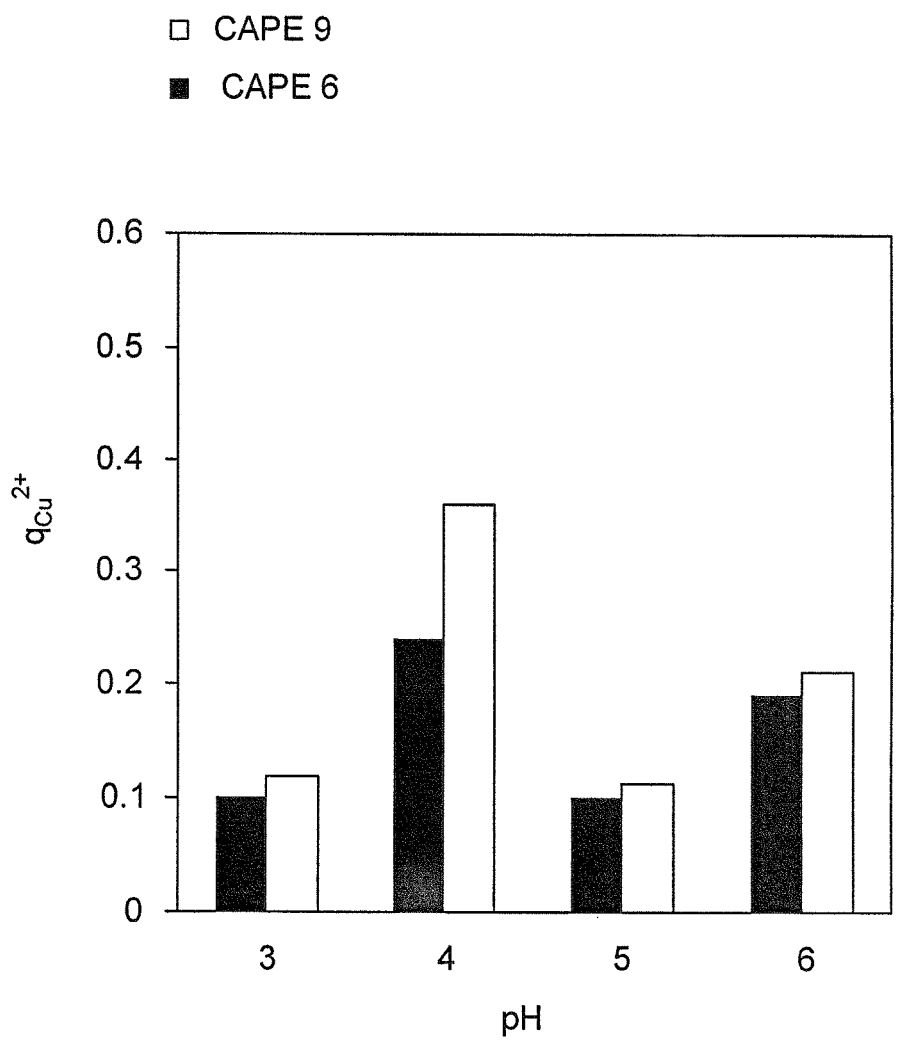
FIG. 7 is a histogram showing the effect of pH on the adsorption capacity for CAPE 6 and CAPE 9 cross-linked polyaminocarboxylates for the removal of metal ions from aqueous solutions according to the present invention.

For the Langmuir isotherm model a dimensionless constant ($R_L$), commonly known as separation factor or equilibrium parameter can be used to describe the favorability of adsorption on the polymer surface by Equation (11):

$$R_L = \frac{1}{(1 + bC_0)} \quad (11)$$

where $C_o$ is the initial $M^{2+}$ concentration and b is the Langmuir equilibrium constant. The more favorable adsorption is reflected by lower $R_L$ values. The adsorption could be either unfavorable ($R_L>1$), linear ($R_L=1$), favorable ($0<R_L<1$) or irreversible ($R_L=0$). The $R_L$ values for the adsorption of both metal ions are given in FIG. 14, which reveals that the values fall in the preferred region (i.e., $0<R_L<1$). The lower values of $R_L$ for the CAPE 9 adsorption (approaching 0) point toward the irreversible nature of the adsorption. It can be noted in FIG. 14 that the $R_L$ values decrease with the increase in the initial $Cu^{2+}$ concentration, indicating that the ion exchange is more favorable at higher initial concentration. For the sorbents CAPE 6 and CAPE 9, the efficiency of $Cu^{2+}$ removal at an initial metal concentration of 0.200 mg L$^{-1}$ was found to be 77.5% and 99.4%, respectively, (Table 4, as shown in FIG. 14). The favorability of CAPE 9 to follow Langmuir is found to be higher, as confirmed by the higher correlation coefficient (0.9910) than in the case of CAPE 6 (0.9697), as shown in FIG. 13. The fitness order toward the isotherm models for CAPE 6 (Freundlich>Langmuir>Temkin) indicates the favorability of adsorption on a heterogeneous surface, whereas for CAPE 9 (Langmuir>Freundlich>Temkin) the favorable process is a monolayer adsorption The effect of pH (in the range 3-6) on the uptake of $Cu^{2+}$ was investigated at a fixed concentration (1 mg L$^{-1}$) and time of 24 h. The pH of the solution was controlled by using an acetate buffer ($CH_3COONa/CH_3COOH$). Results of metal uptake at different pH are shown in FIG. 7. Optimum pH was found to be 4. At higher pH values, hydrolysis of the metal ions occurs by the formation of metal hydroxides, which compete with the metal ion uptake by the resin.

Figure 8A:
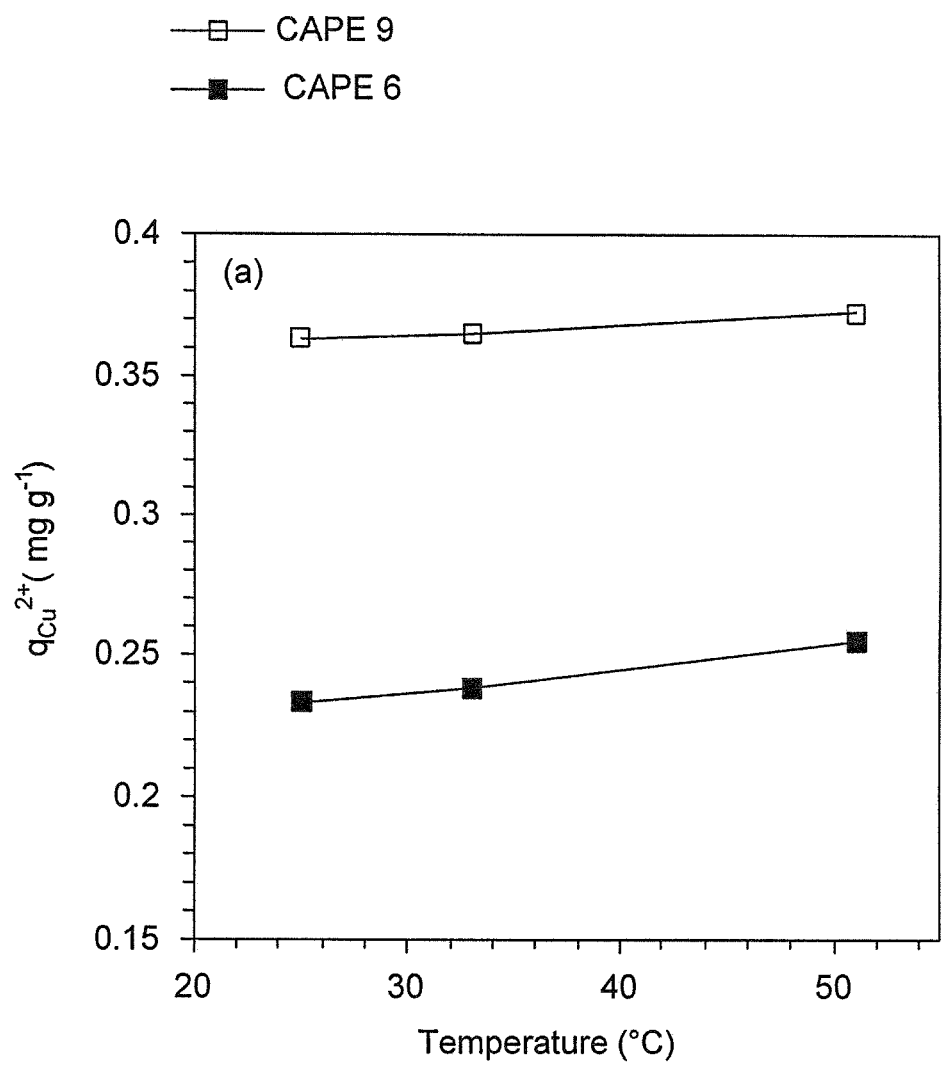
FIG. 8A is a graph showing the effect of temperature on the adsorption capacity for CAPE 6 and CAPE 9 cross-linked polyaminocarboxylates for the removal of metal ions from aqueous solutions according to the present invention.
Figure 8B:
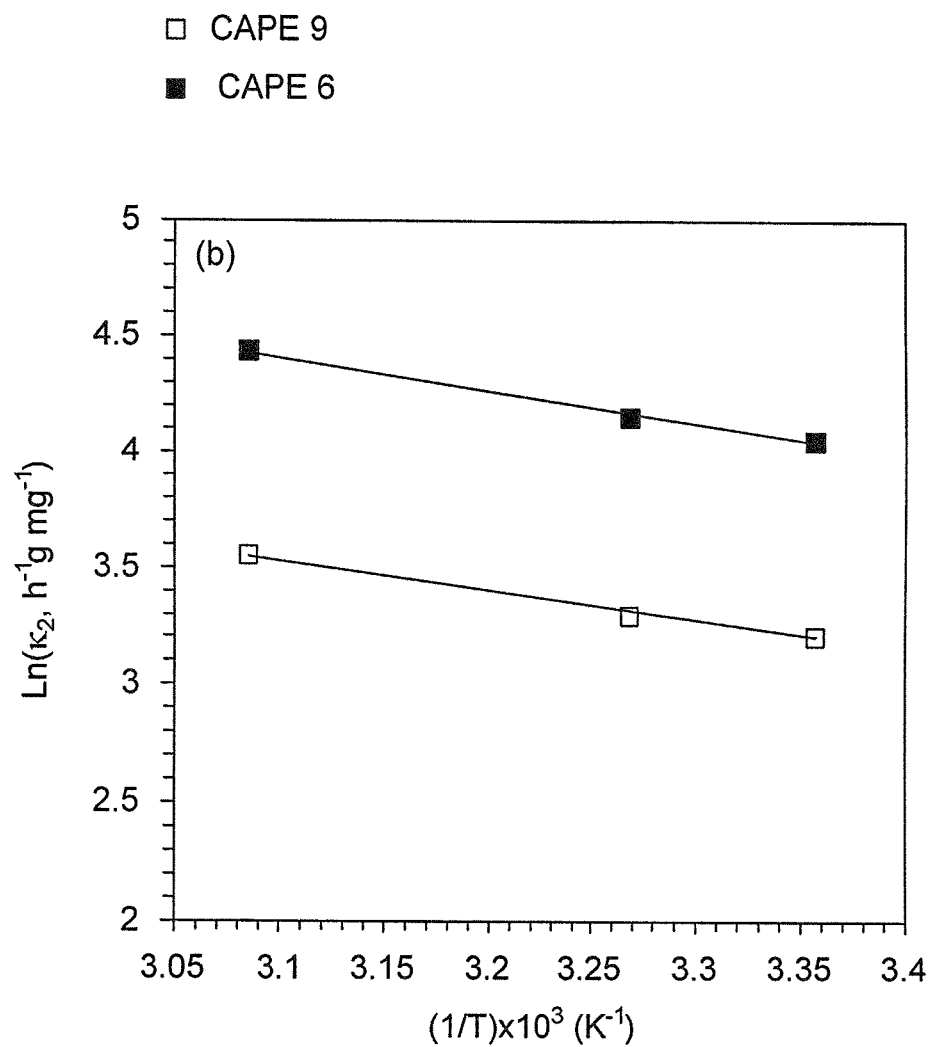
FIG. 8B is an Arrhenius plot for CAPE 6 and CAPE 9 cross-linked polyaminocarboxylates for the removal of metal ions from aqueous solutions according to the present invention.

Adsorption experiments were also performed to obtain the thermodynamic parameters. The results are illustrated in FIG. 8A. As can be seen from FIG. 8A, the adsorption capacity increases with the increase in temperature, suggesting that the adsorption process is endothermic, and this can be explained that at higher temperatures, swelling of the resin increases, which permits greater diffusion of the metal ions. The activation energy of the adsorption process can be calculated by plotting log $q_e$ versus 1/T, as shown in the Arrhenius plot of FIG. 8B. Using the Arrhenius equation (Equation (12)), the activation energies were found to be 11.8 and 10.6 kJ/mol for the adsorption by CAPE 6 and CAPE 9, respectively (FIG. 12). These $E_a$ values are low in comparison to typical chemical reactions with activation energies of 65-250 kJ/mol, thereby indicating that the adsorption of the metal ions is relatively easy and a favored process.

$$\ln k_2 = \frac{E_a}{RT} + \text{constant} \qquad (12)$$

Figure 8C:
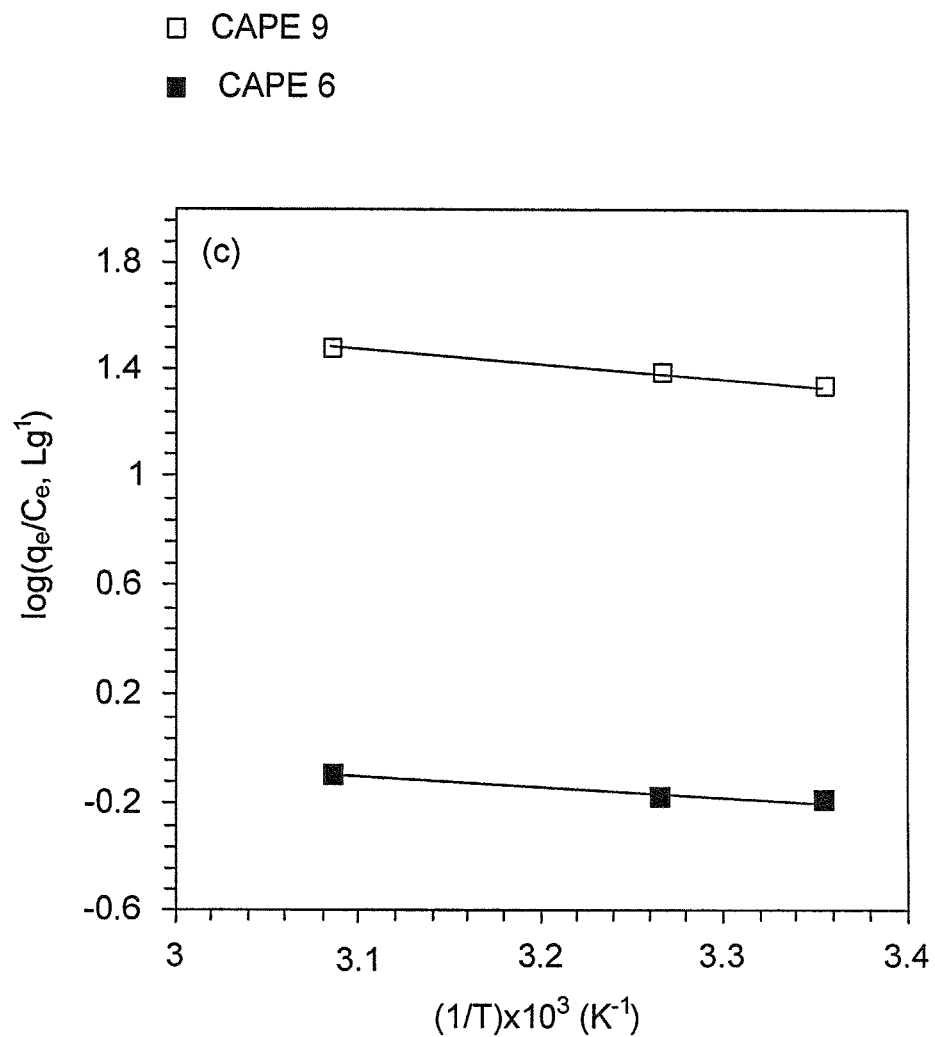
FIG. 8C is a Van't-Hoff plot for CAPE 6 and CAPE 9 cross-linked polyaminocarboxylates for the removal of metal ions from aqueous solutions according to the present invention.
Figure 9A:
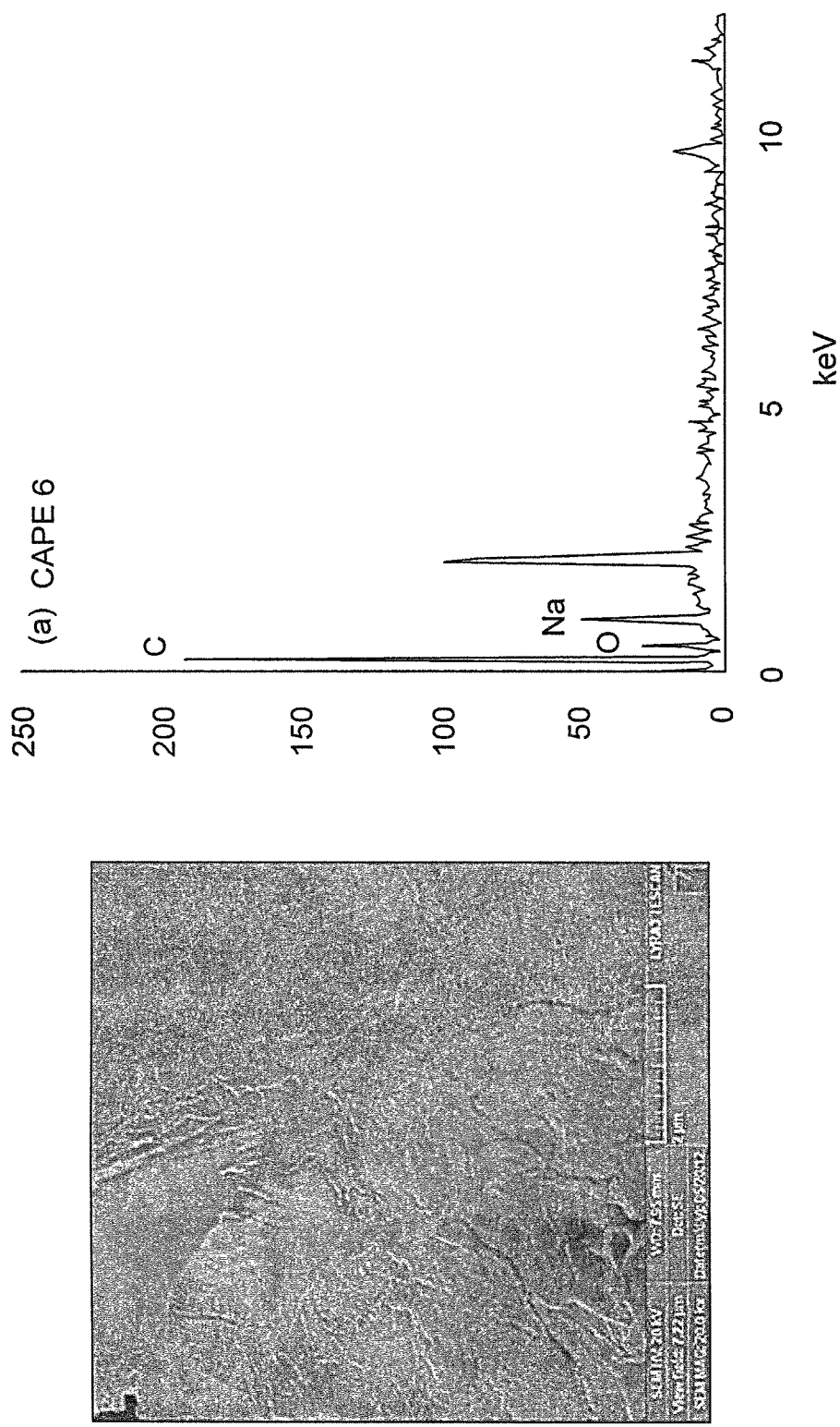
FIG. 9A shows SEM and EDX analysis for unloaded CAPE 6 cross-linked polyaminocarboxylate for the removal of metal ions from aqueous solutions according to the present invention.
Figure 9B:
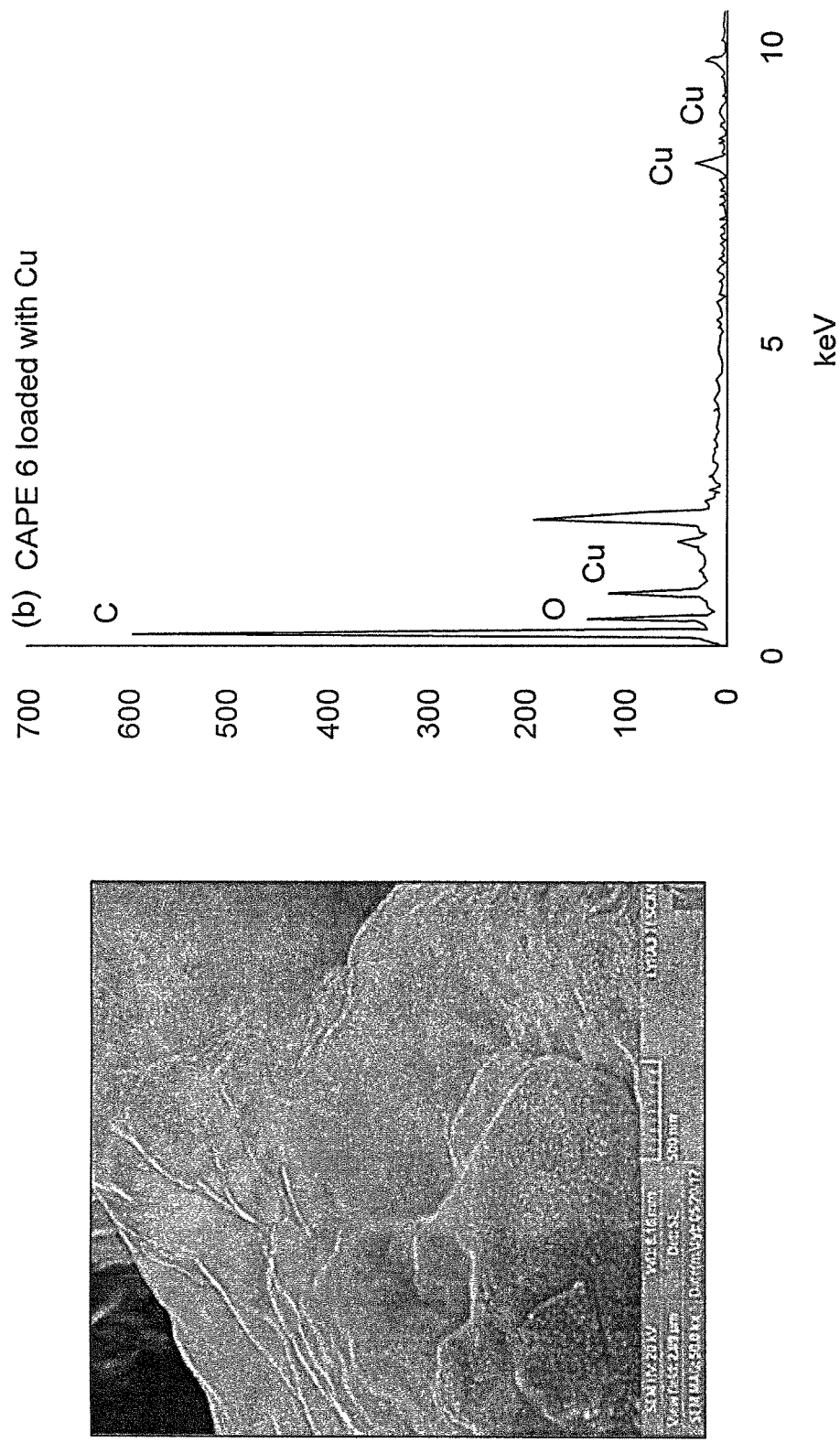
FIG. 9B shows SEM and EDX analysis for CAPE 6 cross-linked polyaminocarboxylate for the removal of metal ions from aqueous solutions according to the present invention, shown loaded with Cu.
Figure 10A:
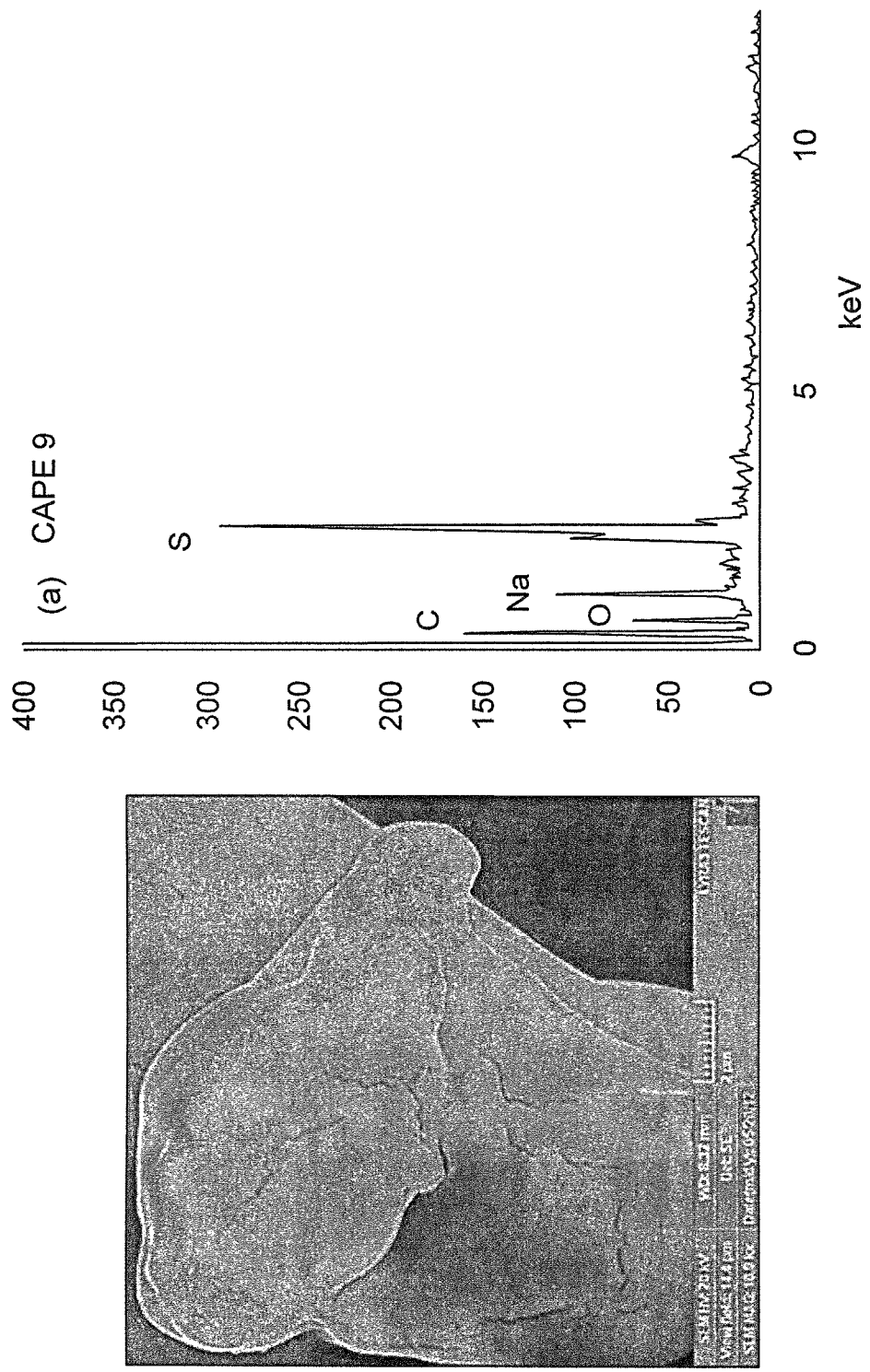
FIG. 10A shows SEM and EDX analysis for unloaded CAPE 9 cross-linked polyaminocarboxylate for the removal of metal ions from aqueous solutions according to the present invention.
Figure 10B:
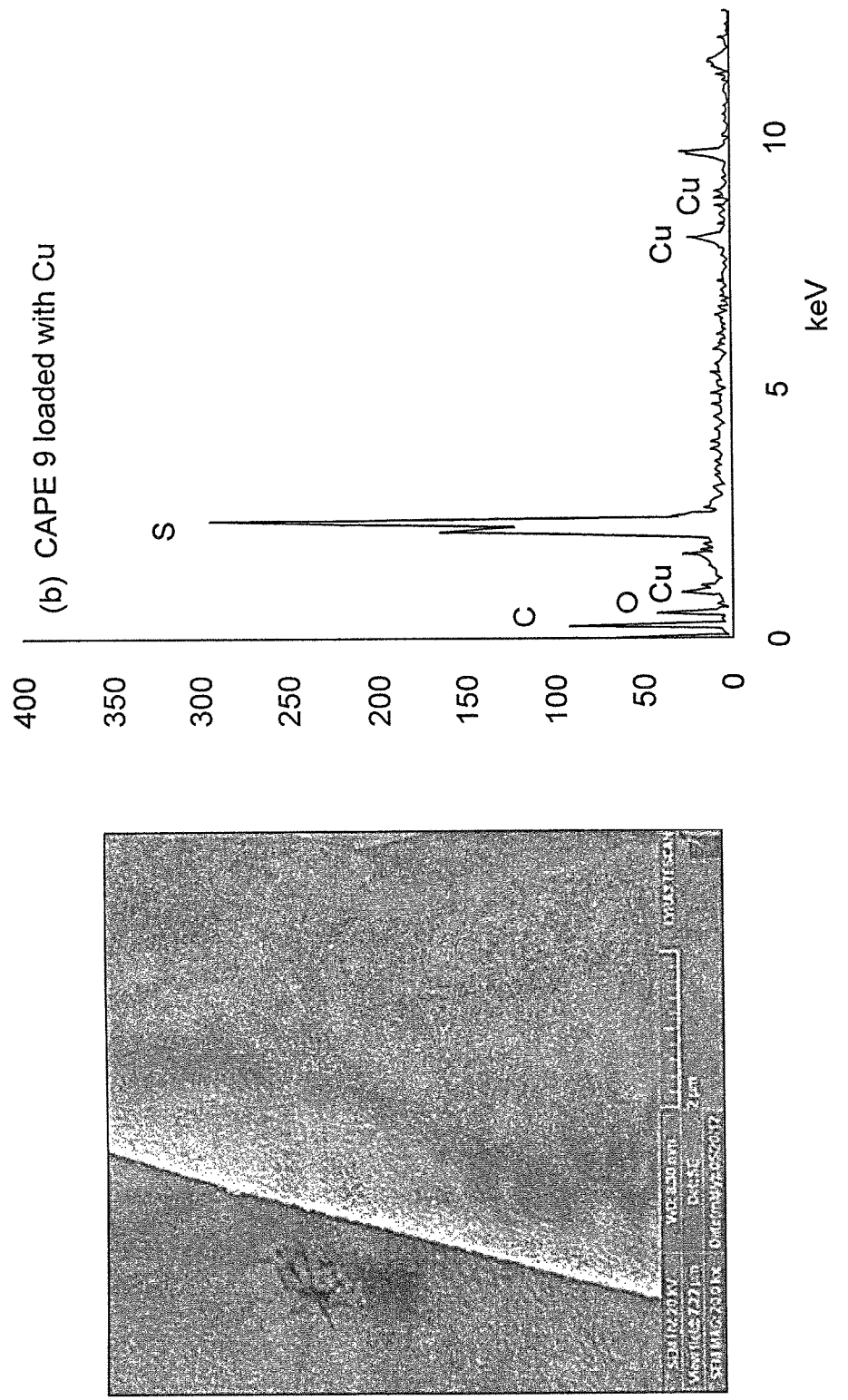
FIG. 10B shows SEM and EDX analysis for CAPE 9 cross-linked polyaminocarboxylate for the removal of metal ions from aqueous solutions according to the present invention, shown loaded with Cu.

A plot of log ($q_e/C_e$) versus 1/T is displayed in the Van't Hoff plot of FIG. 8C. The thermodynamic parameters $\Delta G$, $\Delta H$ and $\Delta S$ were calculated using the Van't-Hoff equation [Eq. (13)], and are tabulated in FIG. 15:

$$\log\left(\frac{q_e}{C_e}\right) = -\frac{\Delta H}{2.303 RT} + \frac{\Delta S}{2.303 R} \qquad (13)$$

The negative $\Delta G$ values for CAPE 9 ascertain the spontaneity of the adsorption process. Note that for CAPE 6, the $\Delta G$ values were positive. As the temperature increases, the $\Delta G$ values become smaller (less positive or more negative), thereby indicating that the adsorption is more favorable at the higher temperatures. Favorable adsorption at higher temperatures is attributed to the greater swelling of the resin and increased diffusion of metal ions into the resin. The positive values of $\Delta H$ certify that the adsorption is an endothermic process. In addition, it can be found in FIG. 15 that the $\Delta S$ values are positive, suggesting that the adsorption is an entropy-driven process as the randomness increased during the adsorption of metal ions as a result of the release of water molecules from their large hydration shells.

Unloaded and loaded resins were investigated by scanning electron microscopy. Unloaded resins were immersed in 0.1 M $Cu(NO_3)_2$ for 24 h at a pH of 4, filtered, and dried under vacuum until constant weight was achieved. Loaded and unloaded polymers were then sputter-coated for 6 min with a thin film of gold.

SEM and EDX images for unloaded and loaded CAPE 6 and CAPE 9 (FIGS. 9A, 9B, 10A and 10B) show that the morphology has been altered by the adsorption of copper ions (cracked morphology to smooth). The EDX analysis shows that CAPE 6 and CAPE 9 have adsorbed copper ions. The color of the resins has also changed from white to blue after adsorption, giving a positive indication that the adsorption process has occurred. The SEM images showed that the resins adsorbed $Cu^{2+}$ ions, and the adsorption process happened on the surface and throughout the polymer (EDX analysis).

Two wastewater samples were collected from (1) a water treatment plant from Doha, Saudi Arabia, and (2) a petrochemical plant in Dhahran, Saudi Arabia. The samples were analyzed to measure the concentration of the native copper concentration in the samples. The concentration was found to be below the detection limit of our analytical method. The water samples were spiked with 1 mg $L^{-1}$ copper, and the samples were mixed and left to equilibrate for 24 h. Then 20 ml of these samples were loaded with 50 mg of CAPE 6 and CAPE 9 to test the ability of these resins to adsorb heavy metals in real wastewater conditions. The results for the analysis are given in FIG. 16 and FIG. 17, which indicate the ability of these resins to adsorb various types of heavy metals from wastewater samples. It is interesting to note that after adsorption, the concentration of $Cu^{2+}$ ions was below the detection limit in one case (FIG. 16). The pH of the wastewater samples was found to be 7.8 (FIG. 16) and 8.5 (FIG. 17), respectively, whereas experiments involving distilled water were carried out at pH 4. At these high pH values, the resins have more anionic sites, which are available for the adsorption of all the $Cu^{2+}$ from the wastewater samples.

The pH-responsive cross-linked polyaminocarboxylates CAPE 6 and CAPE 9 were prepared using Butler's cyclopolymerization protocol. For the sorbents CAPE 6 and CAPE 9, the efficiency of $Cu^{2+}$ removal at an initial metal concentration of 0.200 mg $L^{-1}$ was found to be 77.5% and 99.4%, respectively. The adsorption followed Lagergren second-order kinetic model, and Langmuir as well as Freundlich isotherm models. The adsorption kinetics was found to be controlled by both film diffusion and intraparticle diffusion simultaneously. The negative $\Delta G$s and positive $\Delta H$s ensured the spontaneity and the endothermic nature of the adsorption process. The good adsorption efficiencies implied the efficacy of the resin in removing $Cu^{2+}$ ions from aqueous solution at low concentrations.

It is to be understood that the present invention is not limited to the embodiments described above, but encompasses any and all embodiments within the scope of the following claims.

We claim:

1. A cross-linked polyaminocarboxylate for the removal of metal ions from aqueous solutions, comprising a polymer having the formula:

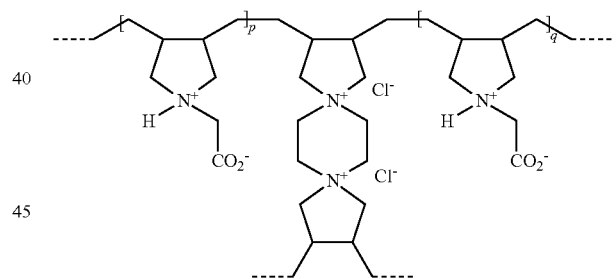

and salts thereof.

2. The cross-linked polyaminocarboxylate according to claim 1, comprising the sodium salt of the polymer having the formula:

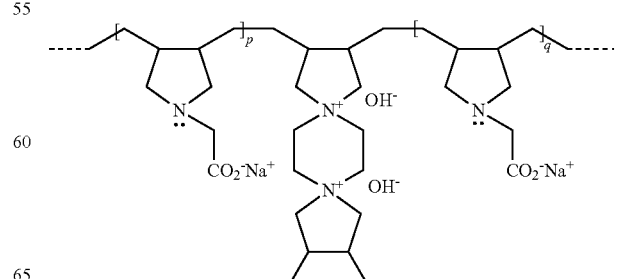

3. A cross-linked polyaminocarboxylate for the removal of metal ions from aqueous solutions comprising a polymer having the formula:
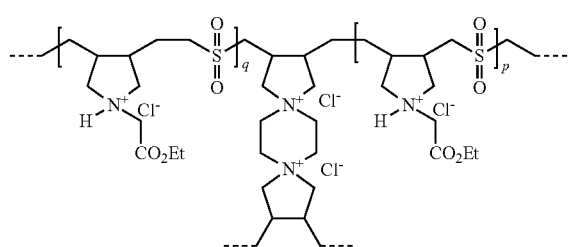
and salts thereof.
4. The cross-linked polyaminocarboxylate according to claim 3, comprising the sodium salt of the polymer having the formula:
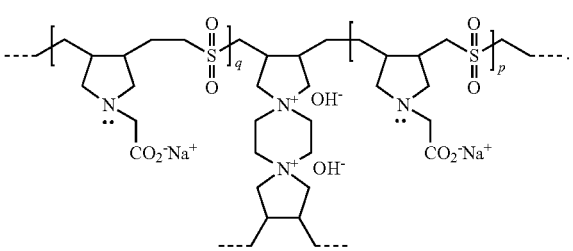
* * * * *